US010803413B1

(12) United States Patent
Xu et al.

(10) Patent No.: US 10,803,413 B1
(45) Date of Patent: Oct. 13, 2020

(54) WORKFLOW SERVICE WITH TRANSLATOR

(71) Applicant: Amazon Technologies, Inc., Seattle, WA (US)

(72) Inventors: Haizhi Xu, Bellevue, WA (US); David Wood, Mercer Island, WA (US); Yun Bai, Bellevue, WA (US); Shreekant Balasaheb Waphare, Seattle, WA (US); Xi Wang, Seattle, WA (US); Aaron-Kenneth Karl Rehaag, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 786 days.

(21) Appl. No.: 15/191,313

(22) Filed: Jun. 23, 2016

(51) Int. Cl.
*G06Q 10/06* (2012.01)

(52) U.S. Cl.
CPC ..... *G06Q 10/06316* (2013.01); *G06Q 10/067* (2013.01)

(58) Field of Classification Search
None
See application file for complete search history.

(56) References Cited

U.S. PATENT DOCUMENTS

| 6,041,306 | A | 3/2000 | Du et al. |
| 6,389,425 | B1 * | 5/2002 | DeMichiel ............ G06F 16/289 |
| | | | 707/812 |
| 7,607,130 | B2 | 10/2009 | Singh et al. |
| 7,761,459 | B1 * | 7/2010 | Zhang ................. G06F 17/2705 |
| | | | 707/755 |
| 7,840,857 | B2 | 11/2010 | Breiter et al. |
| 8,001,429 | B2 | 8/2011 | Breiter et al. |
| 8,392,236 | B2 | 3/2013 | Fung et al. |
| 8,504,400 | B2 | 8/2013 | Purcell et al. |

(Continued)

FOREIGN PATENT DOCUMENTS

| WO | 2001063446 | 8/2001 |
| WO | 2014035283 | 3/2014 |

OTHER PUBLICATIONS

Pohl et al Software Product Line Engineering, ISBN 103540243620, Springer 2005.*

(Continued)

*Primary Examiner* — Octavian Rotaru
(74) *Attorney, Agent, or Firm* — Robert C. Kowert; Kowert, Hood, Munyon, Rankin & Goetzel, P.C.

(57) ABSTRACT

A provider network is configured to provide continuous workflow service for an open-ended number of workflows using non-persistent threads. The provider network includes a workflow translator service configured to receive workflows defined according to multiple workflow domain specific languages and translate the received workflows into a particular domain specific language used by the workflow service to execute workflows. In some cases, the provider network includes a workflow handling service and a workflow evaluation service. The workflow handling service may receive indications of task completion events related to respective workflows, and in turn may send non-blocking requests for workflow decisions from the workflow evaluation service. In generating a workflow decision, the workflow evaluation service may determine resources for executing a workflow.

16 Claims, 10 Drawing Sheets

(56) References Cited

U.S. PATENT DOCUMENTS

| | | | |
|---|---|---|---|
| 9,141,345 B2 | 9/2015 | Armour et al. | |
| 2002/0078431 A1* | 6/2002 | Reps | G06F 7/00 717/100 |
| 2004/0193616 A1* | 9/2004 | Pharies | G06F 8/51 |
| 2005/0160398 A1* | 7/2005 | Bjornson | G06Q 10/06 717/104 |
| 2005/0182779 A1* | 8/2005 | Perry | G06F 16/86 |
| 2006/0133417 A1* | 6/2006 | Cheng | H04L 69/08 370/467 |
| 2008/0189560 A1* | 8/2008 | Case | G06F 12/1458 713/193 |
| 2010/0122241 A1* | 5/2010 | Chatterjee | G06F 8/30 717/140 |
| 2011/0023022 A1* | 1/2011 | Harper | G06F 8/36 717/170 |
| 2011/0153546 A1* | 6/2011 | Latta | G06N 5/00 706/54 |
| 2011/0246250 A1* | 10/2011 | Abraham | G06Q 10/06 705/7.12 |
| 2011/0276945 A1* | 11/2011 | Chasman | G06F 8/71 717/124 |
| 2011/0307877 A1* | 12/2011 | Lambert | G06F 8/72 717/166 |
| 2012/0136648 A1* | 5/2012 | Elliot | G06F 40/40 704/2 |
| 2013/0104099 A1* | 4/2013 | Gores | G06F 8/10 717/104 |
| 2013/0218899 A1* | 8/2013 | Raghavan | G06F 16/156 707/741 |
| 2013/0282746 A1* | 10/2013 | Balko | G06Q 10/06 707/758 |
| 2014/0067705 A1* | 3/2014 | Hunur | G06Q 10/06 705/322 |
| 2014/0188546 A1* | 7/2014 | Goja | G06Q 10/06 705/7.27 |
| 2014/0207619 A1* | 7/2014 | Ishebabi | G06Q 30/0623 705/26.61 |
| 2014/0240745 A1 | 8/2014 | Boldt et al. | |
| 2016/0154627 A1* | 6/2016 | Chandra | G06F 16/258 717/105 |
| 2016/0162486 A1* | 6/2016 | Biswas | G06F 16/35 707/729 |
| 2018/0307587 A1* | 10/2018 | Karmon | G06F 11/3648 |

OTHER PUBLICATIONS

Wikipedia, "Business Process Model and Notation", Retrieved from URL: https://en.wikipedia.org/wiki/Business_Process_Model_and_Notation on May 5, 2016, pp. 1-14.

Aws, "Getting Set Up with Amazon SWF", Retrieved from URL: http://docs.aws.amazon.com/amazonswf/latest/developerguide/swf-dg/dev-amzn-swf-html on Jun. 2, 2016, pp. 1-3.

U.S. Appl. No. 14/871,663, filed Sep. 30, 2015, Aaron-Kenneth Karl Rehaag, et al.

U.S. Appl. No. 14/876,560, filed Oct. 6, 2015, Zakiul Islam, et al.

* cited by examiner

WORKFLOW SERVICE WITH TRANSLATOR

BACKGROUND

Web service providers, and provider networks in general, often allow customers to specify a workflow that accomplishes a set of computational tasks to solve a given computational problem, logistical problem, or generally any process that may be directed by a computer system.

Traditional approaches for providing workflow services usually rely on a service based from a client system. However, such traditional approaches are inflexible in that to provide additional workflow services, the client system becomes a bottleneck. Further, traditional systems often dedicate a continuous allotment of computational resources per workflow. However, such a continuous allotment of computational resources becomes inefficient in the case that there are idle periods between computational activity for a given workflow. Further, traditional approaches may utilize an interface that limits how clients may submit workflows.

Figure 1A:
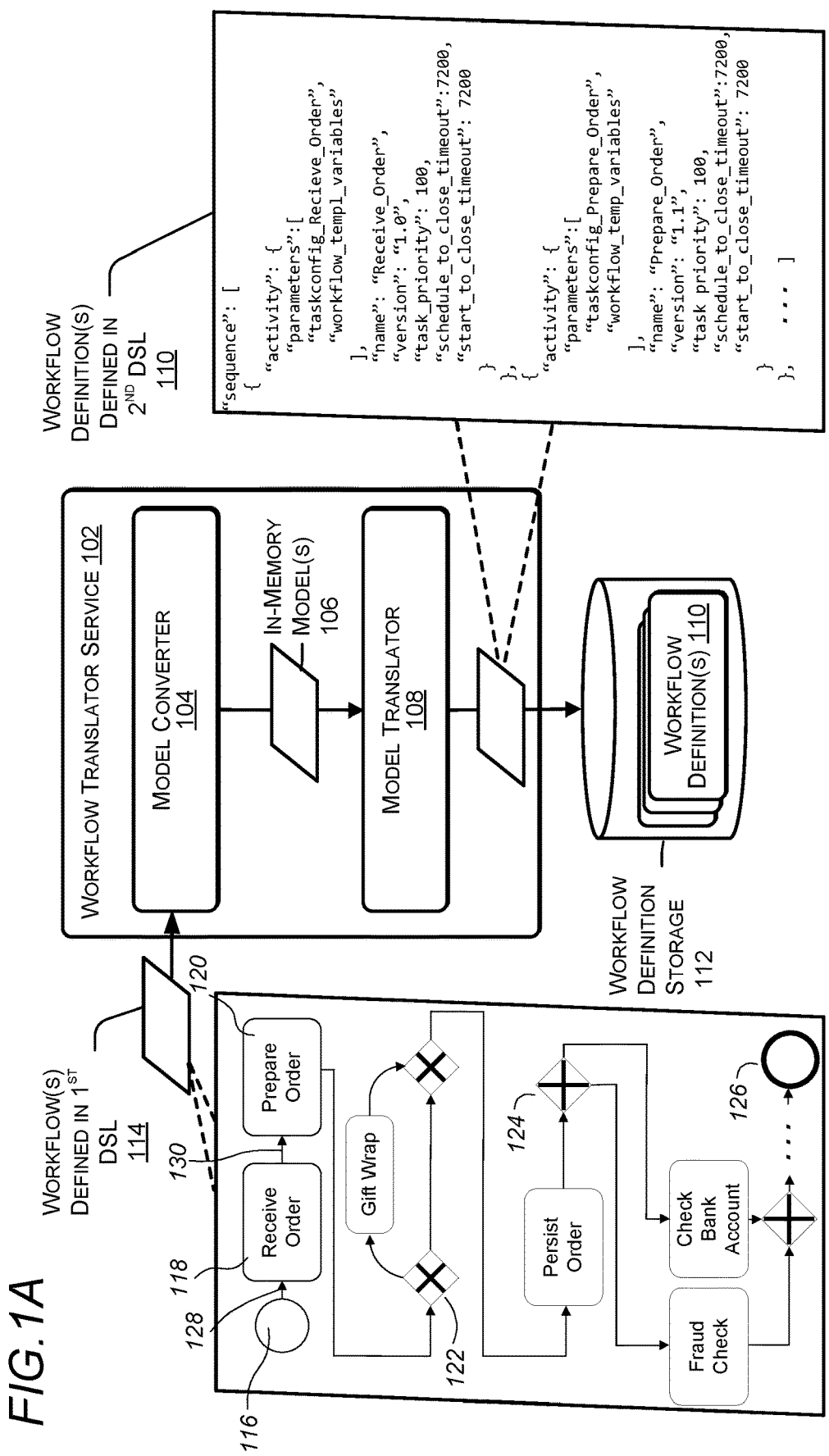
FIG. 1A is an illustrative architecture depicting a workflow translation service according to some implementations.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean inclusive of, but not limited to.

DETAILED DESCRIPTION

The systems and techniques described in this disclosure specify implementations of a workflow service for providing translation and registration of workflow definitions and execution of a workflow corresponding to the workflow definition. The workflow service allows workflows defined in multiple workflow domain specific languages, such as a graph based data structure workflow domain specific language or a workflow domain specific language that visually defines a workflow, to be submitted to the workflow service and translated into a workflow definition in accordance with a workflow domain specific language used by the workflow service. Further, the architecture of the workflow service allows parallel execution of multiple different workflows across multiple host computers within a provider network. In particular, the workflow service provides continuous execution of given workflows without dedicating computing resources for executing the workflow in between states of the workflow, which allows different host computers within the provider network to work on a single given workflow at different points in time—and preventing idle dedication of computing resources for servicing a given workflow.

According to some embodiments, a system includes a workflow translator service implemented on one or more computing devices, and a workflow service implemented on one or more computing devices. In some embodiments, the workflow translator service may be part of a workflow service, or may be a separate service that interacts with a workflow service. The workflow translator service is configured to receive workflows defined in a first domain specific language, wherein the first domain specific language is specific to a first workflow application domain and is structured according to a graph based data structure. For example, the workflow translator service may be configured to receive a workflow defined in accordance with a particular workflow application domain specific language, such as a business process and model notation (BPMN) domain specific language. The workflow translator service is further configured to identify elements of respective in-memory models of respective ones of the workflows defined in the first domain specific language that correspond to workflow elements in a second workflow domain specific language, wherein the second workflow domain specific language is specific to a different workflow application domain and is structured according to a different structure than the first workflow domain specific language.

For example, the workflow translator service may receive a workflow defined in an extensible mark-up language (XML) file that is structured according to a domain specific language specific to a particular workflow application, such as a BPMN workflow. The workflow translator service may convert the XML file into a graphical in-memory model of the workflow defined in the XML file according to the particular application domain specific language, such as the BPMN domain specific language. The workflow translator service may further traverse the graphical in-memory model of the workflow to identify workflow elements, such as nodes, branches, flow objects, connecting objects, and other workflow elements. For identified workflow elements the workflow translator service may determine whether a second domain specific language includes a corresponding workflow element, such as a corresponding connecting object, or a corresponding flow object, etc. In response to determining the second domain specific language includes one of the workflow elements identified in the graphical in-memory model, the workflow translator service may add the corresponding workflow element to a workflow template defined in accordance with the second workflow domain specific language.

The second domain specific langue may be a domain specific language that is used by a workflow service to execute workflows. For example in some embodiments the second domain specific language may be a proprietary workflow language used by a workflow service provider and, in some embodiments, may be formatted in accordance with a different data structure than the first domain specific language. For example, in some embodiments, the second domain specific language may be structured according to a tree based data structure whereas the first domain specific language may be structured according to a graph based data structure. Also, in some embodiments, the second domain specific language may be defined using a different coding language. For example, the first domain specific language may be formatted in accordance with an XML format and the second domain specific language may be formatted in accordance with a different coding language, such as Java script object notation (JSON), or other suitable coding language. In some embodiments, other coding languages, file formats, or structures may be used in the first domain specific language or in the second domain specific language. In some embodiments, both the first domain specific language and the second domain specific language may be non-proprietary domain specific languages. For example, in some embodiments the first domain specific language or the second domain specific language may be open source domain specific languages.

Further, the workflow service of the system is configured to store, in a workflow data store, one or more respective workflow definitions of the one or more workflows according to the second workflow domain specific language, wherein the respective ones of the one or more workflow definitions define states of a respective workflow indicating tasks to be performed for the workflow and transitions between the states. In addition, the workflow service is configured to generate a state machine for a particular workflow according to a particular workflow definition of the one or more respective workflow definitions stored in the workflow data store for the particular workflow; evaluate a current state for the particular workflow to determine a workflow decision for the particular workflow; and schedule for execution a task corresponding to the workflow decision.

According to some embodiments, a method includes receiving a workflow defined in a first workflow domain specific language; identifying elements of a model of the workflow defined in the first domain specific language that correspond to workflow elements in a second workflow domain specific language, wherein the second workflow domain specific language is structured using a different structure than the first workflow domain specific language; selecting the corresponding workflow elements for inclusion in a workflow definition according to the second workflow domain specific language that corresponds to the received workflow defined in the first domain specific language; and storing a workflow definition of the workflow according to the second workflow domain specific language, wherein the workflow definition according to the second workflow domain specific language comprises states of the workflow, tasks to be performed, and transitions between the states.

According to some embodiments, a non-transitory computer readable storage medium stores program instructions that when executed on one or more hardware processors causes the one or more processors to receive a workflow defined in a first workflow domain specific language; identify elements of a model of the workflow defined in the first domain specific language that correspond to workflow elements in a second workflow domain specific language; select the corresponding workflow elements for inclusion in a workflow definition according to the second workflow domain specific language that corresponds to the received workflow defined in the first domain specific language; and store a workflow definition of the workflow according to the second workflow domain specific language, wherein the workflow definition according to the second workflow domain specific language comprises states of the workflow, tasks to be performed, and transitions between the states As a further example, the workflow service may provide a client interface, such as a graphical user interface and a front end, where the client interface provides a platform for the creation and registration of a workflow definition for a workflow. In some embodiments, a client may submit a workflow defined in a domain specific language used by the workflow service to execute workflows directly to the front end without using a workflow translator service. In other embodiments, a client may define a workflow using a graphical user interface generated by a workflow service and a workflow translator service may translate input received via the graphical user interface into a workflow definition in accordance with a domain specific language used by the workflow service to execute workflows. For example, in some embodiments, a client may drag and drop workflow elements to form a visual representation of a workflow using a graphical user interface generated by a workflow service and a workflow translator service may translate the visually defined workflow into a workflow definition in accordance with a domain specific language used by the workflow service to execute workflows.

In some embodiments, a workflow service may support versioning of workflow definitions and a workflow translator service may add a version identifier to a workflow definition. Also, in some embodiments, a workflow translator service may be configured to translate a workflow stored in a second workflow domain specific language back into a first workflow domain specific language.

For example, a client of a workflow service may visually define a workflow using a GUI generated by the workflow service where inputs from the client received via the GUI define the workflow according to a first domain specific language. For example a workflow may be defined via a drag and drop technique via a GUI generated by a workflow service. A workflow translator service of the workflow service may then translate the visually defined workflow from the first workflow domain specific language into a second workflow domain specific language. Prior to storing the translated workflow according to the second workflow domain specific language, a version identifier may be added to the workflow definition.

Subsequently, the client may desire to modify the stored workflow. In such cases, the workflow translator service may translate the stored workflow definition according to the second domain specific language into a corresponding workflow definition according to the first domain specific language. The workflow translated back into the first workflow domain specific language may be made available for the client to view and modify via the GUI and subsequent to the client of the workflow service modifying the workflow definition via the GUI, the modified workflow definition may be translated back into the second domain specific language and stored with a unique version identifier that indicates the modified workflow definition is a subsequent version of the original workflow definition that was stored according to the second domain specific language.

In some embodiments, multiple versions of a workflow may be made without visually defining a workflow via a GUI interface. For example, in some embodiments, a workflow may be received as a file formatted in accordance with a first domain specific language. Subsequently, a modified version of the file may be received as an additional version of the workflow and stored with a unique version identifier indicating that the subsequently received workflow is a version of the original workflow. In some embodiments, an application separate from a workflow service or a workflow translator service may be used to modify a workflow to create multiple versions of the workflow and the different versions of the workflow may be submitted to a workflow service and stored in a workflow depository of a workflow service with unique version identifiers after being translated into a workflow domain specific language used by the workflow service to execute workflows.

Further, in some cases, the front end may validate a workflow definition, and if the workflow definition is valid, then the front end may provide the workflow definition to a workflow handling service to begin executing the workflow. In some cases, the workflow definition may be defined as a state machine, where given states of the state machine specify one or more tasks to be performed for the state, and a transition to other states of the state machine. In this way, as progress is made through different states of the state machine, different tasks corresponding to the workflow are executed. Further, one workflow definition may be used to create any number of workflow threads. For example, if the workflow definition is for a workflow for processing online orders for items to be fulfilled, then the same workflow definition may be used in creating a workflow for each given item ordered.

Continuing with this example, the workflow handling service may begin execution of the workflow corresponding to the workflow definition. For example, the workflow handling service may receive an indication from the front end to begin execution of the workflow, and in response, the workflow handling service may make a request to a workflow evaluation service to determine a next task to schedule for the workflow. Requests from the workflow handling service to the workflow evaluation service may be non-blocking, which allows the workflow handling service to continue to receive indications to advance other workflows without waiting for the response from the workflow evaluation service. Further, the requests may include a log of completed tasks related to the workflow. As noted above, a single workflow definition may correspond to multiple, different workflows, and in such cases, the workflow handling service may maintain a respective workflow log for each respective workflow.

In this example, the workflow evaluation service, for each given request from the workflow handling service for a decision corresponding to a given workflow, may create a workflow evaluation thread to determine the decision and continue to receive requests for decisions for other workflows as each workflow evaluation thread executes. Further, in some cases, different workflow evaluation threads may execute on different computing hosts of a provider network, or within different instantiated computing resources of a given computing host of the provider network. In different embodiments, a workflow evaluation thread may generally be considered a sequence or collection of program instructions whose execution may progress concurrently, in parallel, or in an interlaced manner with other workflow evaluation threads. In some embodiments, a workflow evaluation thread may be spawned, created, or allocated by a parent process or thread, such as the workflow evaluation service. In other embodiments, a workflow evaluation thread may be a worker thread in a thread pool managed by a thread service.

Continuing with this example, for the workflow being initiated, the workflow evaluation thread, created by the workflow handling service in response to receiving the request for a decision, may construct a state machine for the workflow and determine a current state of the state machine. In this example, after evaluation the current state, the workflow evaluation thread may determine a next workflow decision and provide the workflow decision to the workflow handling service so that the workflow handling service may determine a corresponding task for the workflow decision and schedule the task for execution.

Further, the workflow handling service may log or record the workflow decision so that a subsequent workflow evaluation thread may determine a current state for the state machine corresponding to the workflow in order to determine a next workflow decision.

In this example, after the workflow evaluation thread completes, the workflow evaluation thread may terminate and any computing resources that were allocated for performing the workflow evaluation thread may be unallocated, or freed, for use. In this example, because each workflow evaluation thread terminates upon determining a workflow decision, a subsequent workflow evaluation thread—in order to determine a current state for the same workflow—uses the workflow log for a workflow to determine a current state of the state machine for the workflow.

In this way, for any given workflow, because a given workflow evaluation thread is provided with information for determining a current state of a workflow, a workflow evaluation thread does not need to persist in order to determine a current state of a workflow. Thereby preventing idle allocation of computing resources in providing continuous workflow execution.

FIG. 1A illustrates an example computing environment that includes an example embodiment of a workflow translator service, workflow translator service 102. A workflow translator service may be implemented as part of a workflow service or may be a service that interacts with a workflow service. In some embodiments, a workflow translator service may be implemented on computing resources of a provider network or on client computing resources. In some embodiments, a provider network may include a workflow translator service, such as workflow translator service 102, and may receive one or more workflows submitted by clients of the provider network.

In some embodiments, a workflow service may be configured to execute workflows according to workflow definitions that are defined in accordance with a domain specific language in use by the workflow service of the provider network. However, in some cases, clients of a workflow service may desire to submit workflows defined in a different workflow domain specific language other than the domain specific language used by the workflow service to execute workflows. For example, some clients may desire to submit workflows defined in a domain specific language that visually defines a workflow, such as a business process model notation (BPMN) formatted domain specific language. In some embodiments, a workflow service may execute workflows defined in a workflow domain specific languages having a different structure than a structure of a domain specific language in which clients desire to submit workflows. For example clients may desire to submit workflows defined in a domain specific language with a graph based data structure and a workflow service may execute workflows defined in a domain specific language with a different data structure, such as a tree data structure. In some embodiments, a workflow translator service may allow clients of a workflow service to submit workflows defined in a variety of workflow domain specific languages, other than a domain specific language used by the workflow service to execute workflows, to the workflow service for execution by the workflow service. For example, in some embodiments, a workflow service may allow clients of the workflow service to submit workflows defined in YAWL (yet another workflow language), an XPDL workflow language, Business Process Execution Language (BPEL), or various other suitable workflow domain specific languages.

Workflow translator service 102 includes model converter 104. In some embodiments, a workflow may be submitted to a workflow translator service as an XML, file of a graph based data structure. For example, workflow 114 defined in a first domain specific language may be a graph based data structure workflow defined according to a BPMN standard. Workflow 114 illustrates an example of both a visually defined workflow and a workflow defined according to a graph based data structure, such as a workflow defined according to a BPMN standard. In some embodiments, a workflow translator service may translate workflows defined in a workflow domain specific language that does not have a graph based data structure or that is not a visually defined workflow.

As can be seen in FIG. 1A, a workflow may include various workflow elements. For example, workflow 114 includes event 116, which is a workflow start event, multiple activities, such as activity 118 "receive order" and activity 120 "prepare order." Furthermore workflow 114 includes other workflow elements such as an exclusive gateway 122 used to determine whether "gift wrapping" is requested, and a parallel gateway 124 that allows a "fraud check" and a "bank account check" to be performed concurrently. Workflow 114 also includes sequence flow elements between activities and gateways, such as sequence flow elements 128 and 130. In addition, workflow 114 includes a stop event 126 at the end of the workflow. Ellipses are illustrated in workflow 114 to indicate that the workflow may include any number or type of elements supported by a domain specific language in which the workflow is defined. Workflow 114 is illustrated only as an example workflow and should not be construed as an exhaustive list of workflow elements that may be included in a workflow submitted to a workflow translator service.

A model converter of a workflow translator service, such as model converter 104 of workflow translator service 102 may convert a workflow file into an in-memory model. For example, model converter 104 may receive workflow 114 as an XML file and covert workflow 114 into an in-memory model of the workflow, such as in memory model 106.

A model translator of a workflow translator service, such as model translator 108, may traverse an in-memory model of a workflow, such as in-memory model 106, to identify elements of the workflow, such as activities 118 and 120, sequence flow 128, exclusive gateway 122, parallel gateway 124, event stop 126, etc. A model translator may then determine if a second domain specific language, such as a domain specific language used by a workflow service to execute workflows, supports the identified workflow elements. In some embodiments, a determination of whether a second domain specific language supports a workflow element may be performed while a model translator is traversing an in-memory model of a workflow, or in some embodiments, a determination of whether a second domain specific language supports identified workflow elements may be performed after traversing an in-memory model to identify workflow elements.

A model translator of a workflow translator service, such as model translator 108 of workflow translator service 102, may, for identified workflow elements, add corresponding workflow elements defined in accordance with the second domain specific language to a workflow template formatted in accordance with the second domain specific language. In some embodiments, a workflow translator service may cause a workflow service to generate a notification to a client for any workflow elements of a workflow submitted by the client that is not supported in a second domain specific language used by the workflow service to execute workflows. In some embodiments, a client may have an option to modify the submitted workflow to not include the non-supported workflow element or may have an option to attempt to register the workflow and have the workflow translator service not include the non-supported workflow elements in a workflow definition for the workflow.

Once the in-memory model of the submitted workflow has been traversed to identify workflow elements and corresponding workflow elements have been added to a workflow template formatted in accordance with a second domain specific language, the populated workflow template may be stored in a workflow definition storage as a workflow definition for the submitted workflow. For example workflow definition 110 formatted in accordance with a domain specific language used by a workflow service to execute workflows may be stored in workflow definition storage 110. Workflow definition 110 may be a translated version of workflow 114. In some embodiments, a domain specific language used by a workflow service may include additional features that are not supported in a first domain specific language in which a client submits a workflow to the workflow service. For example, workflow definition 110 includes a "time out" feature for tasks or activities that may not be included in workflow 114 defined in accordance with the first domain specific language. In some embodiments, default values may be used for features supported in the second domain specific language that are not included in a domain specific language that is used to define a workflow submitted to a workflow service by a client. In some embodiments, a client of a workflow service, may adjust one or more parameters of a workflow definition translated from a submitted workflow. For example, a client may adjust a timeout value for an activity. In some embodiments, a workflow translator service may be configured to translate workflows defined in multiple different domain specific languages into a domain specific language used by a workflow service to execute workflows.

Workflow definition 110 illustrates a code snippet of a workflow that has been translated into a second domain specific language as an example of a translated workflow. However, in some embodiments, various domain specific languages may be used by a workflow service to execute workflows and a workflow translator service may be configured to translate a workflow received in a first domain specific language into a second domain specific language, wherein the second domain specific language is a different domain specific language than the domain specific language shown in the example code snippet illustrated in FIG. 1A.

Figure 1B:
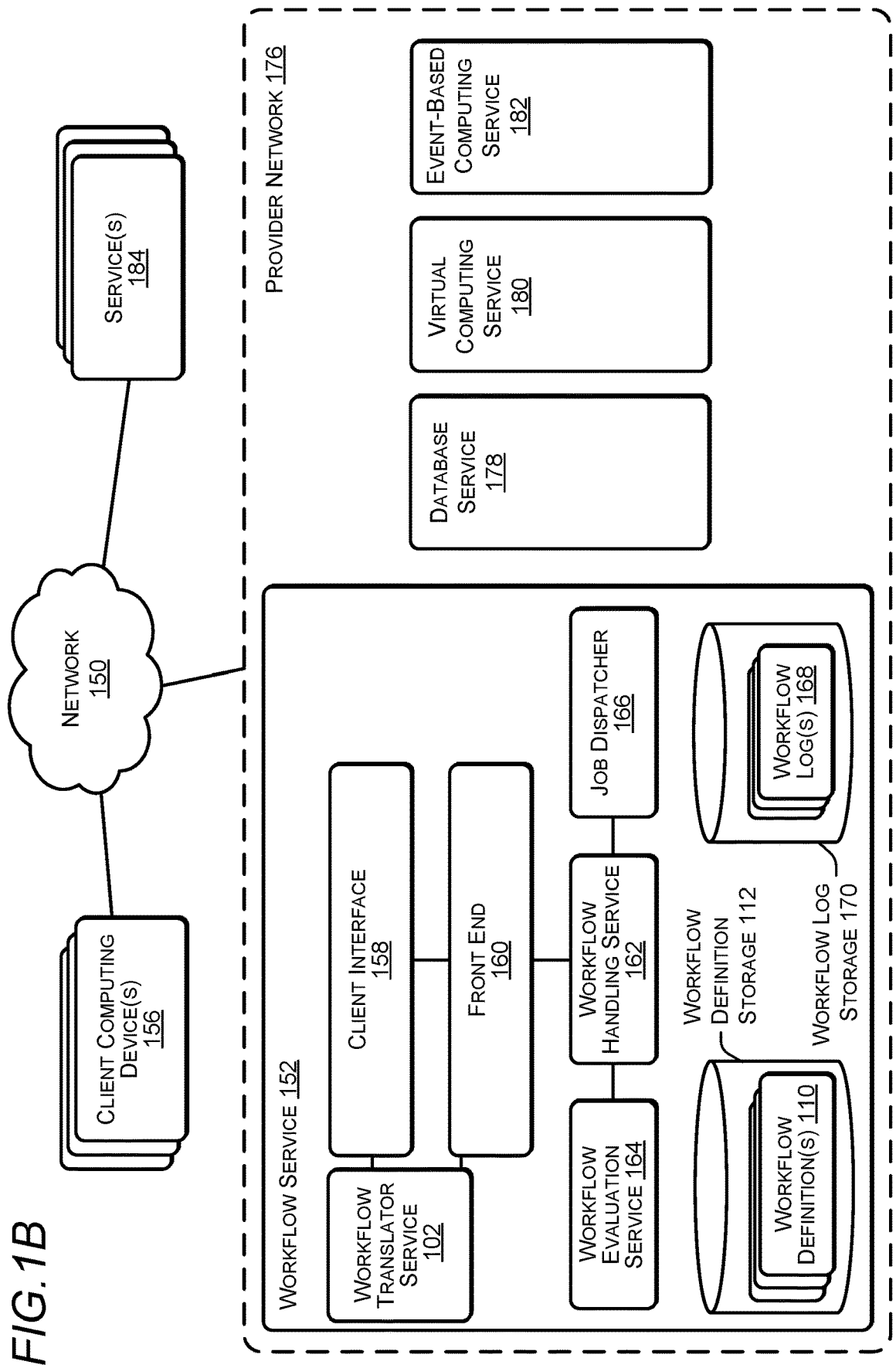
FIG. 1B is an illustrative architecture depicting an example provider network with a workflow service that includes a workflow translation service according to some implementations.

FIG. 1B illustrates an example computing environment that includes an example embodiment of a workflow service, workflow service 152. In this example, the workflow service is implemented within provider network 154. In this example, one or more clients, through one or more respective client computing devices 156 may access client interface 158 of the workflow service using network 150. For example, a client may access a client interface to adjust one or more parameters of a workflow definition. Also, in some embodiments, a client may submit a workflow to a workflow translator service of a workflow service via a client interface. In some embodiments, a client interface may be a graphical user interface that allows a client to visually define a workflow.

As discussed above, a client interface may provide a platform for the specification of a workflow definition. In some examples, the workflow specification may be specified in a development environment providing tools for using a programming language with domain specific language features for defining workflows. In some embodiments, such a domain specific language may include language features for specifying workflow states, workflow tasks, including serial or parallel tasks, workflow state transitions, and workflow error handling, among other features. In some examples, the development environment may also include tools for specifying some or all features of a workflow using graphical tools.

In some examples, the client interface may be provided through a website. In other cases, the client interface may provide an application programming interface for interfacing with a client-side application such as a development kit installation.

As depicted, the client interface may communicate with workflow translator service 102 and front end 160 of the workflow service. The front end may validate a workflow definition received from a workflow translator service and then register the workflow or indicate to a client computing device that a workflow definition failed to validate. While front end 160, workflow translator service 102, and client interface 168 are depicted as separate for the purposes of clarity, the logical functionality of front end 160, workflow translator service 102, and client interface 158 may be combined in different embodiments.

As depicted, workflow service 152 may also include workflow handling service 162, workflow evaluation service 164, and job dispatcher 166. In some embodiments, the logical functionality of a job dispatcher may be included within a workflow handling service instead of being a separate component of the workflow service. As discussed above, workflow handling service 162 may receive indications to either begin a workflow or to advance a workflow. For example, when a workflow is initially validated, the front end may indicate to the workflow handling service to begin execution of the workflow. In other cases, the workflow may have already been started, and the front end may provide to the workflow handling service an indication that a task corresponding to a given workflow has completed, and consequently, that a decision is to be made with regard to a next task to execute for the workflow.

As discussed above, to advance execution of a workflow, the workflow handling service may request a decision to be made for the workflow, where the decision is requested from the workflow evaluation service. Further, in some cases, the request from the workflow handling service may specify a workflow and a corresponding workflow log, where the workflow log may include previous events, completed tasks, or other information related to the workflow. As depicted, workflow logs 168 may be stored in workflow log storage 170.

In some cases, in response to a request from the workflow handling service for a decision for the workflow, the workflow evaluation service may access a workflow definition for the workflow. As depicted, workflow definitions 110 may be stored in workflow definition storage 112.

Further in this implementation, the workflow service may be one of multiple different services provided within a provider network, such as provider network 176. As depicted, other services may include database service 178, virtual computing service 180, and event-based computing service 182, among others. Further, in some embodiments, a database service, such as database service 178, may provide the storage services provided by workflow definition storage 174 and/or workflow log storage 170. More generally, any of the storage services used by the workflow service may be provided by either local storage, a storage service, or a combination of local storage and storage services.

In some embodiments, a workflow may be specified to use services provided entirely within provider network 176. However, in other examples, a workflow may be specified to use one or more services provided from a third party, for example, services 184. In some cases, a combination of provider network services and third party services may be used in the execution of a given workflow.

In this way, beginning with a client system specifying a workflow, a workflow service may begin executing the workflow in a manner that provides continuous workflow processing using multiple, discrete deployments of computation resources in a manner that avoids idle allocations of computing resources. Further, given that a given workflow may be serviced by a new processing thread each time the workflow is to be advanced, distribution of the computation for the processing threads may be spread across different computing hosts of the provider network to avoid computational bottlenecks and to allow for efficient scaling of the servicing of multiple different workflows.

Figure 2A:
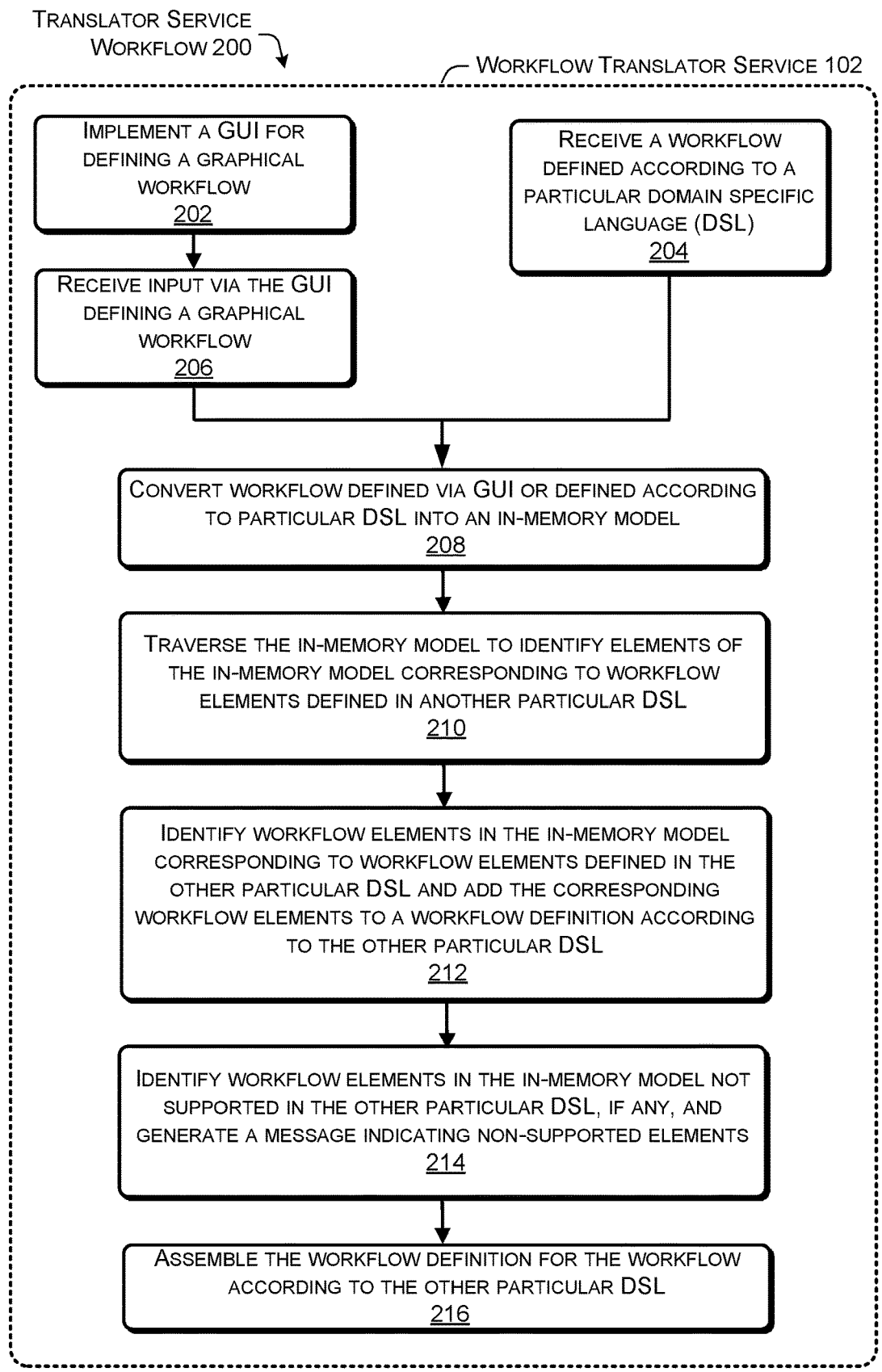
FIG. 2A is a flow diagram illustrating features of a workflow translation process for the workflow translation service according to some embodiments

FIG. 2A illustrates flowchart 200 depicting example operations performed in a workflow translator service 102 of a workflow service in receiving a workflow from a client, wherein the received workflow is not formatted in accordance with a domain specific language used by the workflow service to execute workflows. In some embodiments, a workflow service may be configured to receive workflows defined in a domain specific language other than a domain specific language used by the workflow service to execute workflows. Also, in some embodiments, a workflow service, may generate a graphical user interface (GUI) allowing a client to define a workflow using the graphical user interface. In some embodiments, a workflow service may be configured to both receive workflows defined in a domain specific language other than a domain specific language used by the workflow service to execute workflows and implement a GUI allowing a client to define a workflow via the GUI.

At 202, workflow translator service 102 implements a GUI for defining a graphical workflow. In some embodiments, a workflow translator service, such as workflow translator service 102, may generate a GUI interface for defining a workflow and implement the GUI via a client interface of a workflow service, such as client interface 158. A GUI interface for defining workflows may include a set of workflow elements, such as activities, events, gateways, connections, etc. and may allow a client to drag and drop different combinations of workflow elements to define a workflow via the GUI interface. For example, at 206, the workflow translator service 102 receives input from a client for defining a workflow via the GUI interface. In some embodiments, the received input, may be based on a client dragging and dropping workflow elements to define a workflow via the GUI interface.

In addition, in some embodiments, a workflow translator service, such as workflow translator service 102, may receive a workflow file defined according to a domain specific language other than a domain specific language used by the workflow service to execute workflows. For example, a client may submit an XML file defining a workflow according to a BPMN standard. The BPMN standard may be structured according to a graph based data structure, whereas, in some embodiments, a workflow service may be configured to execute workflows defined using a different data structure, such as a tree based data structure. In some embodiments, a workflow service may be configured to execute workflows defined in multiple different domain specific languages having different data structures without translating the workflows to a specific domain specific language or, in some embodiments, a workflow translator service may support translation of workflows defined in multiple different domain specific languages. For example, in some embodiments, a workflow service may be configured to execute workflows in multiple native domain specific languages or translate workflows defined in multiple different workflow domain specific languages into a common domain specific language used by the workflow service to execute workflows.

At 208, once a workflow is received at 204 or at 206, a model converter of a workflow translator service may convert the received workflow into an in-memory model. For example, the in-memory model may represent a graphical structure of the workflow. In some embodiments, an in-memory model may have a structure other than a graphical structure.

At 210, a model translator of a workflow translator service may traverse the in-memory model to identify workflow elements of the in-memory model. For example, elements of a workflow may include, events, activities, gateways, nodes, branches, switches, etc. In, addition, a workflow translator service may traverse the in-memory model to identify other workflow elements, such as variables.

Some workflow domain specific languages may utilize global variables so that new variables may be introduced anywhere in the workflow, whereas other domain specific languages may use local variables, global variables, control variables, or some other combination of variables. Some domain specific languages may be formatted such that certain variables are initially declared in the workflow definition, such that it is necessary to determine such variables at the outset of translating a workflow to a particular domain specific language. Thus, in some embodiments, a model translator of a workflow translator service may initially traverse an in-memory model to determine variables defined in the model before adding corresponding workflow elements to a workflow definition of the workflow according to a second domain specific language.

In some embodiments, a domain specific language used by a workflow service to execute workflows may define branches of a workflow, where, in order to define the branch, a start point and end point for the branch needs to be determined. In some embodiments, a model translator of a workflow translator service may trace out branches of an in-memory model to determine starting points, ending points, or converging points of branches of the in-memory model in order to define the branches in a workflow definition in a domain specific language used by a workflow service to execute workflows. In some embodiments, after identifying workflow elements of the in-memory model, a model translator of a workflow translator service may determine corresponding workflow elements that correspond to the identified workflow elements of the in-memory model that are defined according to another domain specific language, such as a domain specific language used by a workflow service to execute workflows. The identified corresponding workflow elements defined in the other domain specific language may be selected for inclusion in a workflow template formatted in accordance with the other domain specific language. In some embodiments, a model translator of a workflow translator service may determine corresponding workflow elements defined in the other particular domain specific language and add the corresponding workflow elements defined in the other domain specific language to a workflow template while traversing the in-memory model to identify workflow elements. While in other embodiments, a model translator of a workflow translator service may add corresponding workflow elements to a workflow template after traversing the in-memory model to identify workflow elements.

At 214, a model translator of a workflow translator service may identify workflow elements in the in-memory model that do not have corresponding workflow elements in the other particular domain specific language. For example, a first workflow domain specific language may include a particular type of gateway that is not supported in a second domain specific language in which a workflow service executes workflows. In response to identifying workflow elements that are not supported in the other particular domain specific language, the workflow service may generate a message to a client of the workflow service indicating that one or more workflow elements of the submitted workflow are not supported by a domain specific language that the workflow service uses to execute workflows. In some situations, the client may revise the workflow to not include the non-supported workflow element(s) and re-submit the workflow. In other situations, the client may continue with registration of the workflow and the workflow translator service may omit the non-supported workflow elements from a translated version of the submitted workflow.

At 216, a workflow definition is assembled in a workflow template using the identified workflow elements that are supported in the particular domain specific language. For example, assembling the workflow definition may include adding paths between identified workflow elements that have been translated into the particular workflow domain specific language. In some embodiments, the particular domain specific language may include features not included in a domain specific language in which the workflow was submitted. For example, in some embodiments, a domain specific language used by a workflow service to execute workflows, may support workflow logs, task timeout periods, and other additional features. In some embodiments, assembling a workflow definition for the workflow according to the other particular domain specific language may include setting default values for features supported in the other particular domain specific language but not supported in the domain specific language in which the workflow was submitted. For example, assembling a workflow definition may include setting a default amount of time for a task timeout feature that is not supported in a domain specific language in which the workflow was submitted.

Figure 2B:
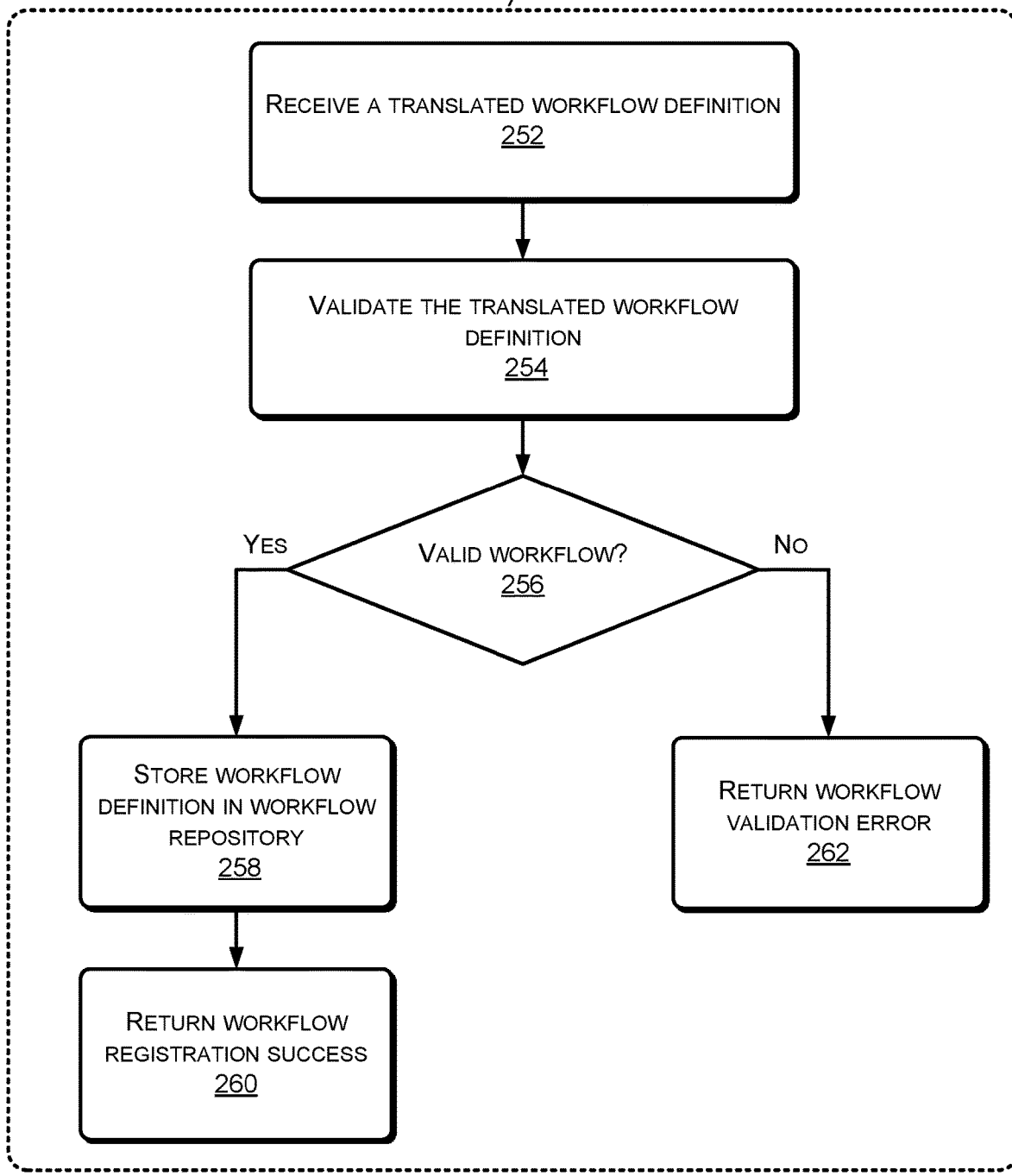
FIG. 2B is a flow diagram illustrating features of a registration and validation process for the workflow service according to some embodiments.

FIG. 2B illustrates flowchart 250 depicting example operations performed in a workflow service in receiving a workflow definition for a workflow from a workflow translator service or in receiving a workflow definition already defined in a domain specific language used by the workflow service to execute workflows. In this example, the workflow service may receive a workflow definition from a workflow translator service or from a client, as depicted at 252. As discussed above, the workflow definition may be specified in a domain specific language that describes a state machine for the workflow, including tasks, transitions, error handling, and a terminating condition, among others or may be translated into a domain specific language that describes a state machine for the workflow, including tasks, transitions, error handling, and a terminating condition, among others. In some embodiments, at 252 in addition to receiving a workflow an indication of a version for the received workflow may be received. For example, a client may indicate that a submitted workflow is a second version of the workflow.

The workflow service, given a workflow definition, may validate the workflow definition, as depicted at 254. In some cases, the validation may include validating that certain types of error handling are valid, data flows between states of the workflow state machine are valid with regard to parameter inputs and outputs, including other forms of validation.

If the workflow definition is valid, and as depicted at 256, the workflow service may store the workflow definition in a workflow repository and return a workflow registration success message, as depicted at 258 and 260, respectively. Otherwise, if the workflow definition is not determined to be valid, the workflow service may return a workflow validation error, as depicted at 262. In some embodiments, a version identifier may be associated with the workflow when the workflow is stored at 258. In some embodiments, a workflow service may generate a version identifier for a workflow at 258.

Once a workflow definition is successfully registered, the workflow service may invoke the workflow handling service to begin execution of the workflow.

Figure 3:
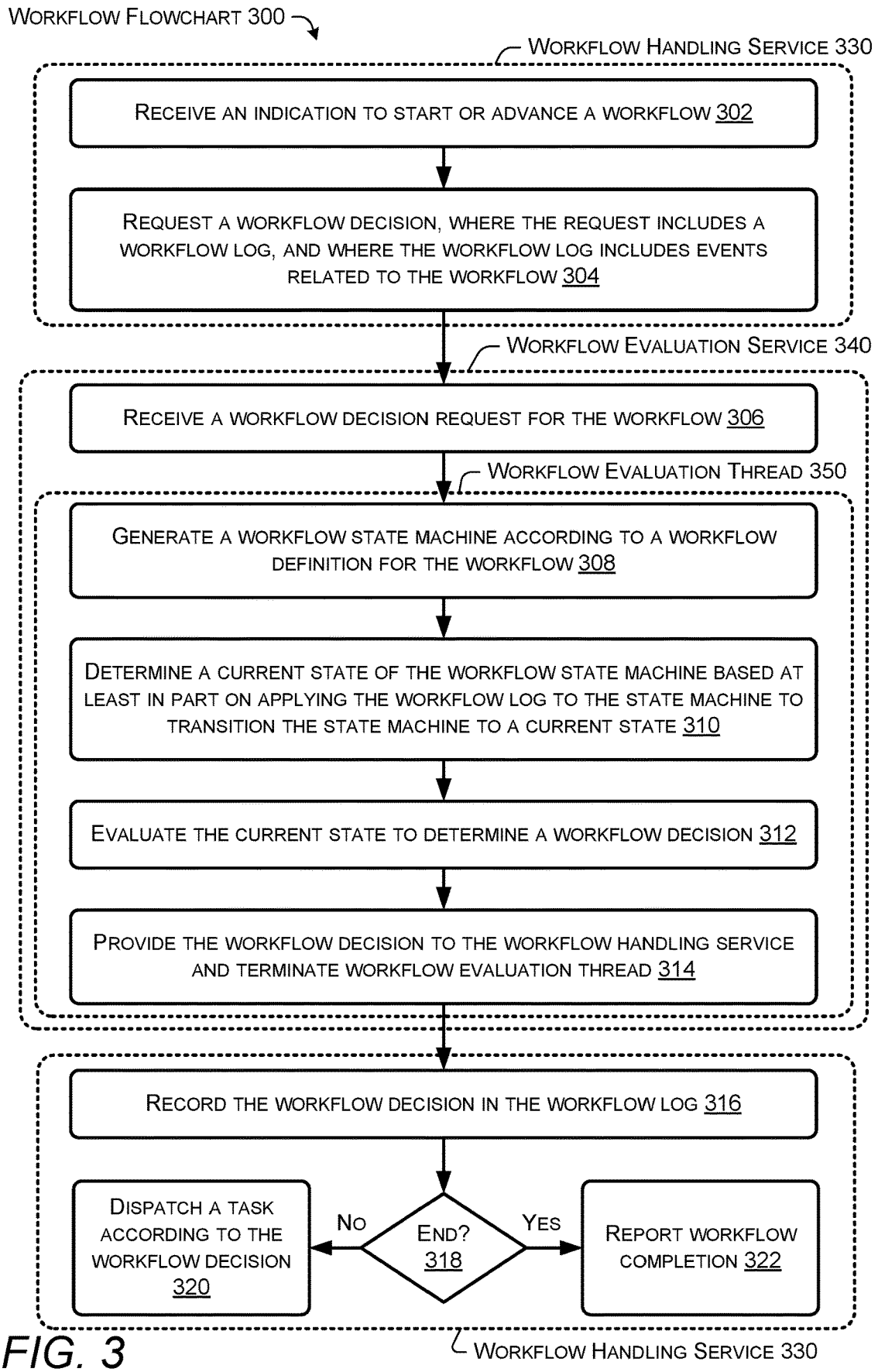
FIG. 3 is a flow diagram illustrating features of a workflow service according to some implementations.

FIG. 3 illustrates flowchart 300 depicting example operations performed in a workflow service in executing a workflow. As one example, workflow service 152 within provider network 176 may validate and register a workflow definition. As described with regard to FIG. 2B, if the workflow definition is determined to be valid, the workflow handling service may be invoked to either begin executing or to advance the workflow. For example, front end 160, may call the workflow handling service with parameters indicating the workflow, and indicating that the workflow is to begin executing.

In this example, as depicted at 302, the workflow handling service may receive the call or indication to start the workflow. In other cases, once the workflow has begun executing, the workflow handling service may receive indications with regard to the already executing workflow describing a task completion event for the workflow. In such an instance, as depicted at 302, the workflow handling service may receive an indication to advance the workflow and also receive a description of, for example, a task that has completed for the workflow.

The workflow handling service may also log or record an indication of the event within a workflow log corresponding to the workflow. In this example, the workflow handling service may record an indication that the workflow was requested to begin executing or record an indication that a task for the workflow has completed. In other cases, the event may indicate a task failure, or some other status information related to the workflow, and the workflow handling service may record any and all information with regard to the workflow. Further, in some cases, the workflow handling service may log each recording of information with a sequence number or timestamp so that an order may be determined with regard to the logged information.

In this example, the workflow handling service, in response to receiving the indication to start or advance the workflow, may request a workflow decision from the workflow service, as depicted at 304. The request from the workflow handling service to the workflow service may include an indication of the workflow and the workflow log or a reference to the workflow log, where the workflow log may include events related to the workflow, as depicted at 304.

In this example, the operations performed by the workflow handling service are indicated within flowchart 300 by workflow handling service 330. The request for a workflow decision from workflow handling service 330 to the workflow evaluation service 340 may be a non-blocking request such that after the workflow handling service sends the request, the workflow handling service is available to process additional indications to start or advance other workflows while the workflow handling service 340 is processing a previous request. Further, workflow evaluation service 340 may receive a workflow decision request and create a workflow evaluation thread 350 to determine a workflow decision. In some cases, after the workflow evaluation service 340 creates and initiates a workflow evaluation thread 350, the workflow evaluation service is available to receive additional requests for additional workflow decisions. In this way, workflow evaluation service 340 may spawn any number of workflow evaluation threads to execute in parallel to determine any number of respective workflow decisions.

One effect of the workflow handling service using non-blocking requests and the workflow evaluation service spawning parallel workflow evaluation threads is that as increased numbers of workflows are created and serviced, there are no bottlenecks in the actual processing of the workflow decisions, but rather the limit is in how quickly the workflow handling service receives and sends requests for workflow decisions—which may be done efficiently since this is a small number of quick operations—and how quickly the workflow evaluation service receives and creates workflow evaluation threads which, again, may be done efficiently since this is a small number of quick operations.

Continuing with this example, as depicted at 306, workflow evaluation service 340 may receive the workflow decision request for the workflow. In this example, the workflow decision request from the workflow handling service may include a workflow log for the workflow. Receiving the workflow log may effectively transfer state of the workflow to the workflow evaluation service. To determine a workflow decision, workflow service 340 may allocate computing resources on a host computer and create a workflow evaluation thread to determine the workflow decision, where the workflow evaluation thread may execute on the allocated computing resources. In this example, the host computer may be one of multiple different host computers available to the workflow evaluation service within the provider network.

The workflow evaluation thread, once created, may proceed to generate a state machine for the workflow, where the workflow is specified according to a workflow definition, as depicted at 308. In this example, the state machine is created from scratch and has no dependencies or reliance on previously generated state machines or previously determined workflow decisions. Given a created state machine, the workflow evaluation thread may determine a current state of the workflow based at least in part on applying the workflow log to the state machine to transition the state machine to a current state of the workflow, as depicted at 310. For example, an ordered list of completed tasks in the workflow log may be accessed, and the workflow evaluation thread may correspond each completed task with a transition in the state machine as indicated by transitions specified in the workflow definition. In this way, events logged in the workflow log, in correspondence with the workflow definition, may be used to transition from an initial state of a state machine for the workflow to a current state for the workflow.

Given a current state of the state machine for the workflow, the workflow evaluation thread may evaluate the current state to determine a workflow decision, as depicted at 312. For example, the workflow evaluation thread may determine, according to the workflow definition for the workflow, that at a current state, and given previously completed tasks, that a next decision includes a particular task, operation, or decision. The workflow evaluation thread may then provide the workflow decision to the workflow handling service, as depicted at 314.

The workflow handling service, in response to receiving the workflow decision from the workflow evaluation thread, may record the workflow decision in the workflow log, as depicted at 316. Further, the workflow handling service may determine, as depicted at 318, that the workflow decision corresponds to completion of the workflow or that the workflow decision corresponds to a task.

If the workflow decision corresponds to a task to be executed for processing the workflow, as depicted at 320, then the workflow handling service may dispatch a task according to the workflow decision. In other cases, the workflow handling service may instead provide the task to be performed to a job dispatcher, where the job dispatcher may schedule the task to be executed. At this point, if the workflow handling service is not servicing additional requests to advance other workflows, then the workflow handling service may wait for a task completion event, upon which the workflow handling service may begin again as depicted at 302.

If the workflow decision corresponds to completion of the workflow, as depicted at 322, then the workflow handling service may report completion of the workflow, for example, to the front end. In turn, the front end may notify a client of the completion of the workflow.

Figure 4:
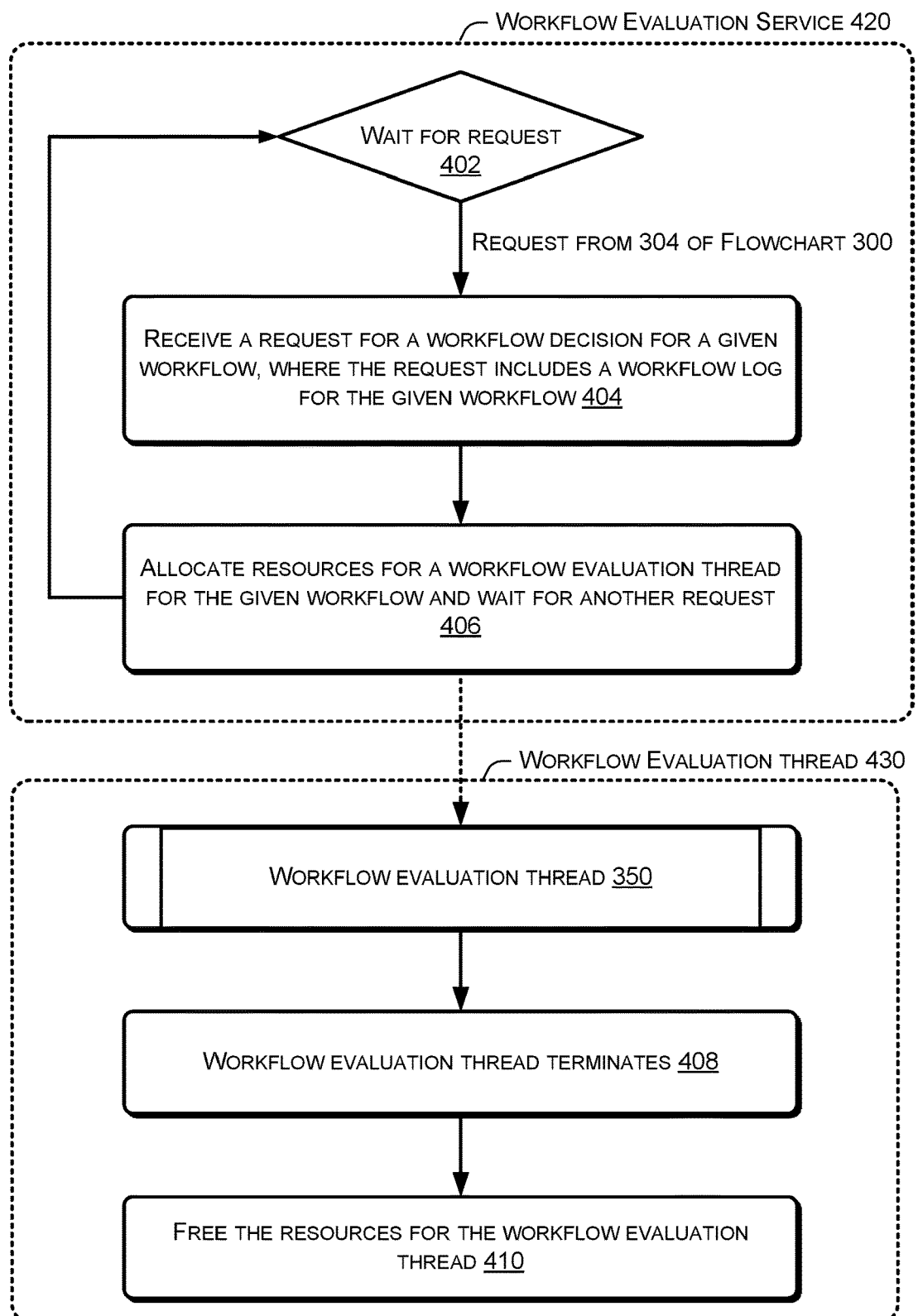
FIG. 4 is a flow diagram illustrating features of a workflow evaluation service of the workflow service according to some implementations.

FIG. 4 illustrates flowchart 400 depicting example operations performed by a workflow evaluation service. As discussed above with regard to FIG. 3, a workflow evaluation service may be workflow evaluation service 340. In between processing workflow decision requests, a workflow evaluation service may wait for request from the workflow handling service, as depicted at 402.

In this example, a request may be received from a workflow handling service, such as a request from 304 in flowchart 300 of FIG. 3. As depicted at 404, the workflow evaluation service may then receive the request for a workflow decision from the workflow handling service, where the request may include a workflow log for the workflow.

As described above with regard to FIG. 3, the workflow evaluation service, to determine a workflow decision, may allocate computing resources for executing a workflow evaluation thread that determines and returns the workflow decision to the workflow handling service, where after the workflow evaluation thread is created and initiated, the workflow evaluation service may wait for additional requests, as depicted at 406.

As described above with regard to FIG. 3, the workflow evaluation thread may proceed to determine a workflow decision for the workflow, including the operations 308-314 of FIG. 3. After the workflow evaluation thread provides the workflow handling service with a workflow decision, the workflow evaluation thread may terminate and the allocated computing resources used to execute the workflow evaluation thread may be freed, as depicted at 408 and 410. In this way, the allocated resources may be made available for processing other workflow decisions.

As discussed above, the allocated resources may be freed or unallocated because each time a request for a workflow decision is received, a workflow evaluation thread may determine, from scratch or entirely from the workflow log and workflow definition, a current state for the workflow and a next workflow decision.

Figure 5:
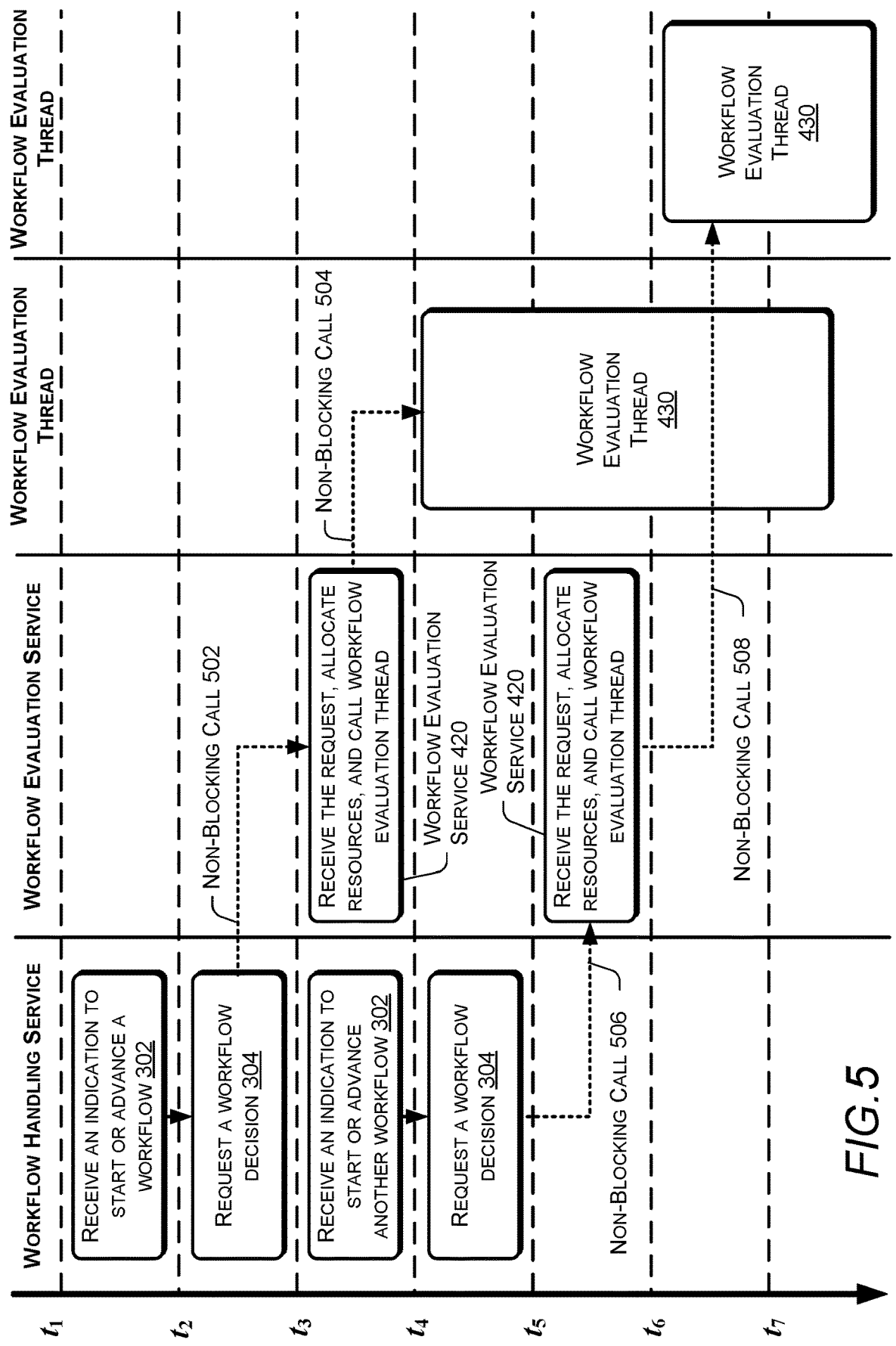
FIG. 5 is a flow diagram illustrating features of a workflow handling service and workflow evaluation service of a workflow service operating in parallel according to some implementations.

FIG. 5 illustrates parallel operations between the workflow handling service, the workflow evaluation service, and workflow evaluation threads discussed above with regard to FIGS. 2B-4. In this example, the workflow handling service may receive an indication to start or advance a workflow, as depicted at 302 at time $t_1$, where 302 corresponds to the operations described above with regard to FIG. 3.

In this example, the workflow handling service may then request a decision for a workflow decision for a first workflow, as depicted at 304 at time t2. Further, the request from the workflow handling service to the workflow evaluation service may be a non-blocking call, as depicted by non-blocking call 502. Given that the request for a workflow decision is non-blocking, as soon as the workflow handling service makes the request, the workflow handling service is available to process or receive additional requests, which in this example, is depicted at 302 at time t3.

In this example, the request from the workflow handling service is received by the workflow evaluation service at time t3, which as described above, is also approximately the time at which the workflow handling service receives another indication to start or advance another workflow. As depicted by workflow evaluation service 420 at time t3, the workflow evaluation service may receive the request for a workflow decision, along with a workflow log, allocate computing resources for a workflow evaluation thread to determine the workflow decision and then proceed to initiate or call the workflow evaluation thread. In this example, the call to the workflow evaluation thread from the workflow evaluation service 420 at time t3 is depicted by non-blocking call 504.

As depicted at time t4, at this point, the workflow handling service has already received an indication to start or advance another workflow, and may then request a workflow decision via non-blocking call 506. Further at time t4, a workflow evaluation thread for determining a workflow decision for the first workflow has been started, as depicted by workflow evaluation thread 430 called by non-blocking call 504.

The request for a workflow decision for the other workflow at time t4 and via non-blocking call 506 may be received by workflow evaluation service 420 at time t5. Further at time t5, while the workflow evaluation service 420 is processing the request for the other workflow decision, the workflow evaluation thread 430 initiated at time t4 for the first workflow decision is still executing.

Further as depicted at time t5, after the workflow evaluation service 420 allocates computing resources for a workflow evaluation thread to determine the other workflow decision, the workflow evaluation service 420 may call the workflow evaluation thread 430 via non-blocking call 508.

As depicted at time t6, at this point, both workflow evaluation thread 430 initiated at time t4 to determine the first workflow decision and workflow evaluation thread 430 initiated at time t6 to determine the other workflow decision are executing. As described above, the different workflow evaluation threads may be executing on different allocated resources, and in some cases, the different allocated resources may be on different host computers of the provider network. In other cases, the different allocated resources may be on the same host computer of the provider network. As discussed below in FIG. 6, a determination of what resources to use to execute the workflow evaluation threads may be made by a load balancer.

Figure 6:
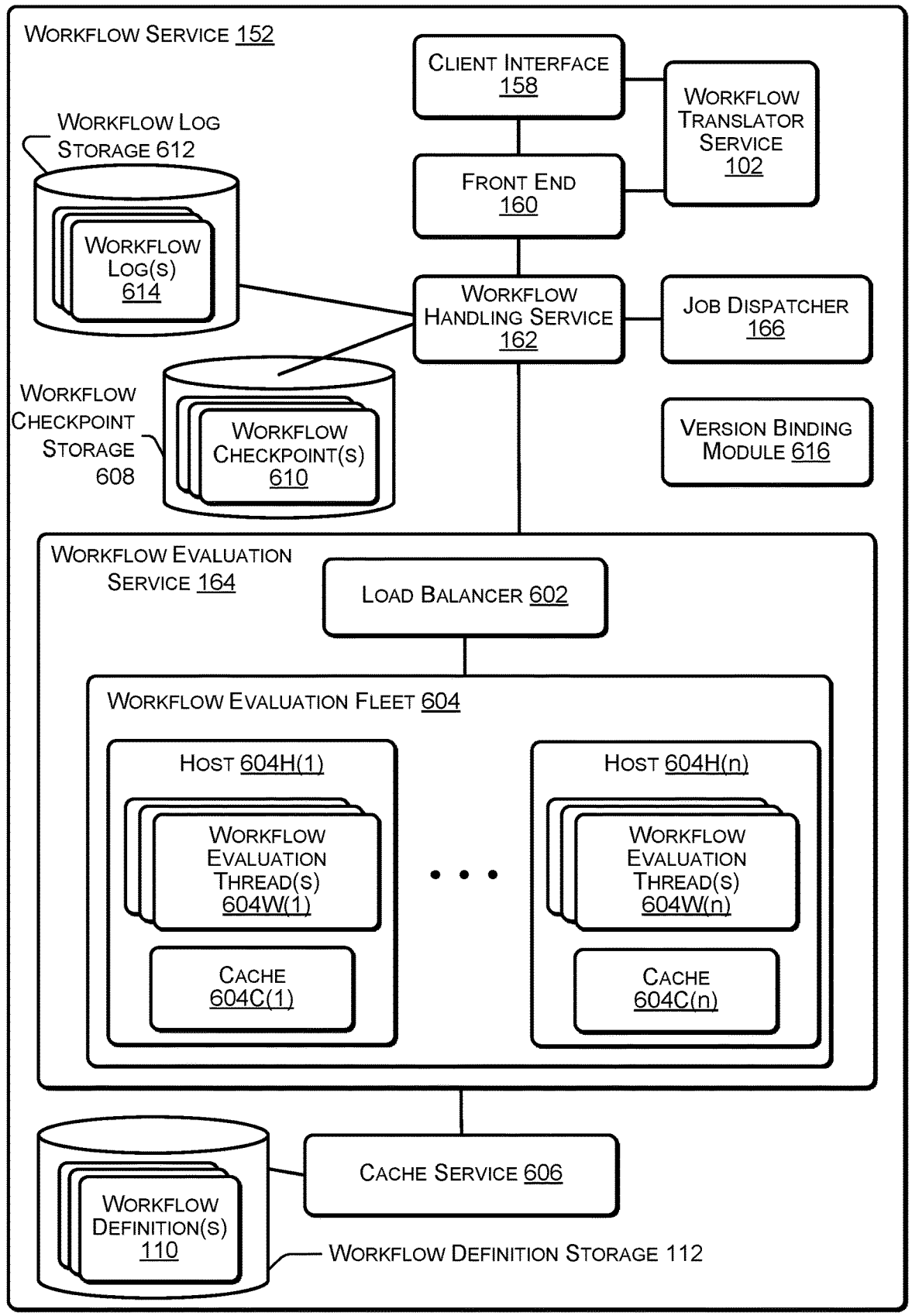
FIG. 6 is another illustrative architecture depicting an example workflow service within a provider network according to some implementations.

FIG. 6 illustrates an embodiment of workflow service 152 with additional possible features. In this embodiment, workflow service 152 includes, as depicted in FIG. 1, client interface 158, workflow translator service 102, front end 160, workflow handling service 162, and job dispatcher 166. However, in this example, workflow evaluation service 164 includes a load balancer, load balancer 602, and a workflow evaluation fleet of host computers or systems, hosts 604H(1)-604H(n).

As discussed above with regard to FIG. 5, a workflow evaluation service may receive multiple requests from a workflow handling service for different workflow decisions for different workflows. In such an example, the workflow evaluation service may determine how to distribute processing of the workflow decisions. As depicted, the workflow evaluation service may include a load balancer that serves to receive multiple requests for workflow decisions, and to determine which computing resources to deploy for executing respective workflow evaluation threads for determining the workflow decisions.

In this example, the computing resources from among which the load balancer 602 may deploy for executing different workflow evaluation threads is depicted by workflow evaluation fleet 604. In this example, workflow evaluation fleet 604 may include multiple computing hosts, hosts 604H(1)-604H(n). Example workflow evaluation threads are depicted by workflow evaluation threads 604W(1)-604W(n).

In some embodiments, each of computing hosts 604H(1)-604H(n) may include a respective local cache, local caches 604C(1)-604C(n). While the examples discussed above with regard to FIGS. 1B-5 describe workflow evaluation services and workflow evaluation threads that operate without persisting a current workflow state for a workflow from one instance of a workflow evaluation thread to a subsequent instance of a workflow evaluation thread, in some cases, while the workflow evaluation thread may terminate, the state machine created by the workflow evaluation thread may remain stored in a local cache for the host on which the workflow evaluation thread executed.

In some cases, for example in a workflow that quickly transitions between states of the state machine for the workflow, a state machine created by a workflow evaluation thread at, say, time to, may still reside in the local cache when a subsequent workflow evaluation thread executes at, say, time to. In different example, the local cache for a given host may store data according to different retention policies.

Further, in some instances, it may be that while a state machine for a given workflow may be in a local cache, say local cache 604C(1), when a subsequent workflow evaluation thread is initiated, the load balancer may deploy the subsequent workflow evaluation thread to execute on a different host and different local cache, for example host 604H(n) and local cache 604C(n). In such an example, the previously constructed state machine for the given workflow may not be available to the subsequent workflow evaluation thread even though the state machine for the given workflow still resides in a different local cache.

To overcome such a situation, in some embodiments, the workflow evaluation service may use a cache service, such as cache service 606. Cache service 104 may be a distributed cache, and in some cases, cache service 606 may be the storage tier from which data in the host caches move data. For example, in the previous example, where a load balancer deploys a workflow evaluation thread to determine a workflow decision from host 604H(1), and the state machine for the workflow is stored in local cache 604C(1), the state machine may be flushed or copied from local cache 604C(1) into cache service 606.

In this way, in this example, at a subsequent time, when a subsequent workflow evaluation thread for the given workflow executes from a different host, the workflow evaluation thread may access the state machine for the workflow from the cache service 606. In such an example, the subsequent workflow evaluation thread may determine a workflow decision without constructing a state machine from the workflow definition.

In other embodiments, a workflow service may also use checkpoints to determine a current state of a state machine without transitioning through all states of the state machine from the initial state to a current state. For example, the workflow handling service may periodically or aperiodically store a checkpoint, where the checkpoint defines a particular state of the state machine up to a particular point in the workflow. In this example, a workflow evaluation thread may apply the checkpoint to the state machine to reach the particular state of the state machine. In some implementations, the checkpoint for a workflow may be received as a parameter of the request for a workflow decision and passed from the workflow evaluation service to the workflow evaluation thread. In other implementations, the workflow evaluation service or the workflow evaluation thread may access the checkpoint corresponding to a given workflow from a data store or database service. In this example, the workflow evaluation thread may then reference the workflow log to transition the state machine from the particular state to the current state of the state machine, for example. For example, the workflow evaluation thread may find an event in the workflow log corresponding to the checkpoint, and transition the state machine using events subsequent to the checkpoint up to a current event. Further in this example, the workflow checkpoints are indicated by workflow checkpoints 610.

Further, in this embodiment of workflow service 152, the workflow handling service may use a workflow log storage for maintaining current workflow logs, such as workflow log storage 612. As depicted, workflow log storage 612 may store workflow logs 614.

In some embodiments, workflow service 152 may also include a version binding module, such as version binding module 616. As described above, a single workflow definition may be used to create multiple instances of a workflow. In such an example, the processing for each different workflow still corresponds to the same workflow definition. However, in some cases, a version binding module may be used to correspond, or bind, different workflow definition versions with different instances of workflows. For example, a client may create a workflow definition and create a corresponding workflow. While this workflow is executing, the client may create an updated version of the workflow definition and create another workflow using the updated workflow definition. In this way, the other workflow using the updated workflow definition may be created and started while the workflow using the previous version of the workflow definition is still executing. In other words, a workflow definition version may be maintained and bound to an executing workflow for the execution life cycle of the workflow. Further, any number of workflows using different versions of may be concurrently executing, thus allowing for rolling releases of workflows for workflow definitions with different sets of features. In some examples, the front end of the workflow service may provide the user with choosing any given version, past or current, of a workflow definition from which to start a workflow.

Figure 7:
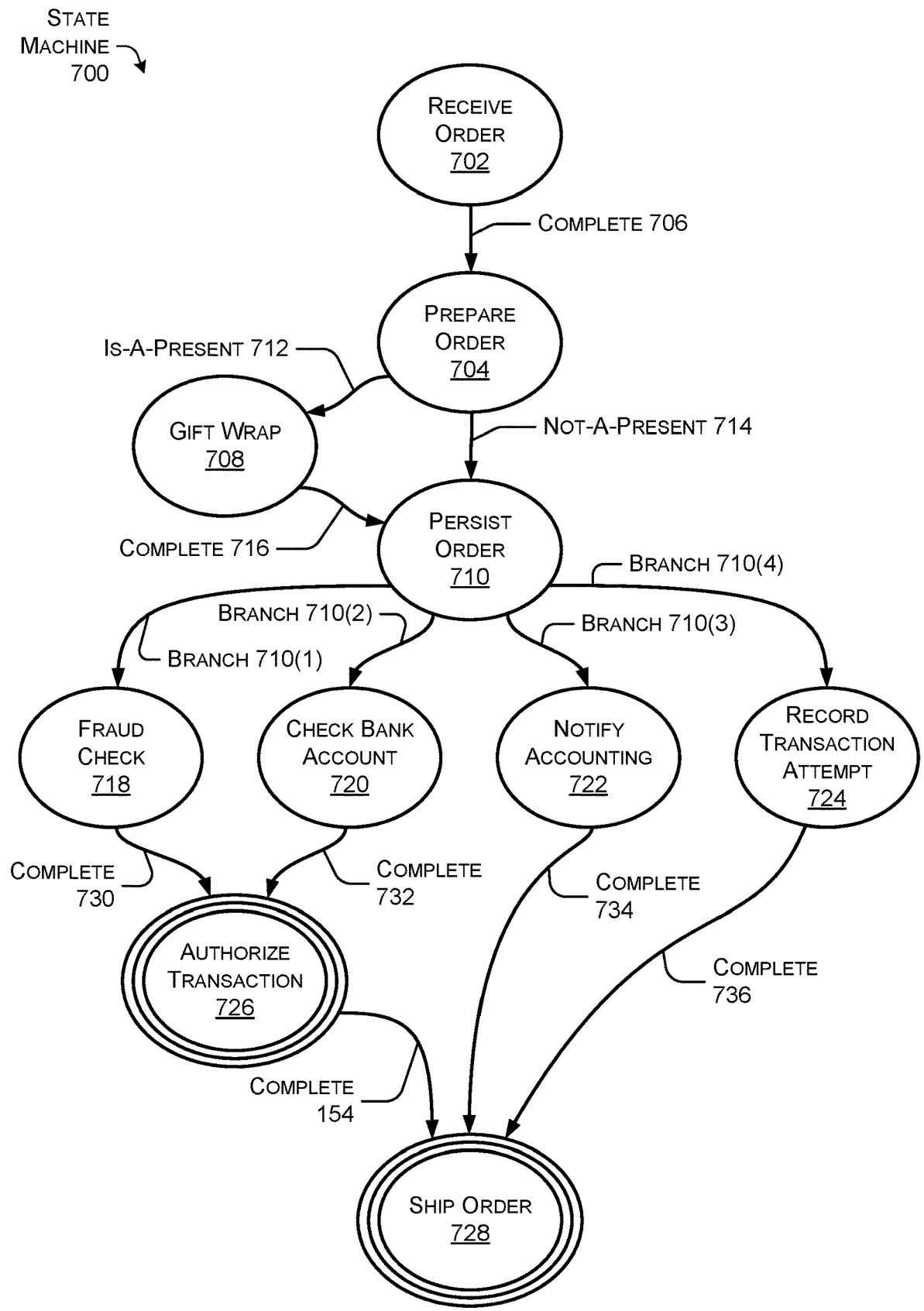
FIG. 7 is a flow diagram illustrating features of an example state machine for a workflow definition for a workflow according to some implementations.

FIG. 7 illustrates an example state machine, state machine 700, corresponding to a workflow, such as a workflow defined according to a workflow definition translated from a workflow submitted by a client in a domain specific language other than a domain specific language used by a workflow service to execute workflows. In this example, the workflow includes multiple states and different types of transitions in between states. In other examples, different numbers, different types, and different types of transitions may be specified in a workflow definition. As discussed above, in some embodiments, a domain specific workflow used by the workflow service to execute workflows may define the states, transitions, and tasks of a state machine for a workflow.

In this example, a workflow may be defined to perform order fulfillment services. For example, the first state of a state machine for the workflow may be defined to be receiving an order, as depicted at 702. With regard to the workflow handling service described above with regard to FIGS. 1-6, state machine 700 specified within a workflow definition for a workflow may be received in another workflow domain specific language other than a domain specific language used by the workflow service to execute workflows, translated by workflow translator service 102 and validated by front end 160 of the workflow service. The front end, based on validating the workflow definition, may call the workflow handling service to start the workflow. The workflow, in turn, may then send a request for a workflow decision for the workflow to the workflow evaluation service, where the workflow log for the workflow may be empty of any completed tasks, but may include a record of an indication to start the workflow. After sending the request for the workflow decision, the workflow handling service may then wait for a next request to advance or start a workflow until it receives the workflow decision.

In some cases, a single state of a state machine for a workflow may be specified according to a domain specific language to be a state module that includes one or more tasks, an identification of one or more resources for performing the one or more tasks, and one or more transitions or branches to other states. Together, the individually defined states may be interpreted as a whole to specify the operations to be executed in servicing a workflow.

In this example, a first state of the state machine for the workflow, receive order 702, may specify using a domain specific language supported by the workflow service that a task to be performed uses a resource provided by a particular service, and that upon completion of the task, receive order 702 state transitions to prepare order 704 state. In this example, completion of the task for the receive order 702 state is indicated by complete 706.

Again, with regard to the workflow handling service and the workflow evaluation service, after the workflow evaluation service receives the request for a workflow decision, the workflow evaluation service may, as depicted in FIG. 4, allocate computing resources for a workflow evaluation thread to determine the workflow decision. Once initiated, the workflow evaluation thread may access the workflow definition that specifies the state machine for the workflow and construct the state machine. Given a constructed state machine, in this case state machine 700, the workflow evaluation thread may determine the first state and access the workflow log to traverse through the state based on events logged in the workflow log until a current state of the state machine is reached.

In this example, given the constructed state machine and a workflow log for the workflow indicating that no tasks have been completed for the state machine, the workflow evaluation thread may determine that the current state is receive order 702. Further, the workflow evaluation thread may use the workflow definition to determine that given the current state of receive order 702, that the workflow decision should be to perform a task indicated by the state module for the receive order 702 state. This workflow decision may be provided to the workflow handling service for scheduling of the task.

At a later time, when a notification corresponding to a completion of the task for the receive order 702 state is received by the workflow handling service, the workflow handling service may again request a workflow decision from the workflow evaluation service. At this point, the first task of the workflow for fulfilling an order may be completed.

In response to receiving a request to advance to the workflow, the workflow handling service may again send a request for a workflow decision to the workflow evaluation service. The workflow evaluation service may repeat the process for handling a request for a workflow decision. However, at this point, the workflow evaluation thread that is created accesses the same workflow definition as the first workflow evaluation thread, but the workflow log may include a record of the first task having been completed. Accordingly, after constructing state machine 700, the workflow evaluation thread may end up a current state of prepare order 704 based on the workflow log indicating that the task for receive order 702 having been completed.

Given that each workflow evaluation thread uses the workflow definition and workflow log to determine a current state, there is no data flow from one workflow evaluation thread to a subsequent workflow evaluation thread, thereby allowing each subsequent workflow evaluation thread to be scheduled to execute on different computing resources without any negative computational impact. Further, such scheduling allows a load balancer the flexibility to deploy any computing resources without regard to which resource was previously used to process a workflow decision request. Further still, given that each workflow evaluation thread may independently determine a current state for a state machine, the load balancer may use any factors to determine the computing resources to be deployed. Including, for example, workloads on a given host, price constraints in a client contract for provider services, performance requirements specified in a client contrast for provider services, or a combination of factors, including other factors.

At this point in the workflow, the workflow handling service may receive a workflow decision for the workflow and schedule a corresponding task for the prepare order 704 state. In this example, depending on whether or not the order is a gift, the workflow evaluation service may provide the workflow handling service with a workflow decision corresponding to a task to gift wrap the order or the persist the order, as depicted at gift wrap 708 and persist order 710. Further, the transitions between prepare order 704 and gift wrap 708 is depicted by is-a-present 712, and the transition between prepare order 704 and persist order 710 is depicted by not-a-present 714. The transition in between the gift wrap 708 state and the persist order 710 state is depicted by complete 716.

From the persist order 710 state, the workflow evaluation service may determine that there four tasks to schedule as part of a workflow decision for the four branches from the persist order 710 state, branches 710(1)-710(4). Accordingly, the workflow handling service may schedule for execution tasks corresponding, respectively, fraud check 718, check bank account 720, notify accounting 722, and record transaction attempt 724.

In this example, when the task corresponding to the fraud check 718 state completes, the workflow handling service is called, which requests a workflow decision from the workflow evaluation service. In this example, the workflow evaluation thread may reach the authorize transaction 726 state, but the authorize transaction 726 state may specify that both the fraud check 718 task or tasks and the check bank account 720 task or tasks are to be completed before tasks for the authorize transaction 726 state are performed. The transition between the fraud check 718 state and the authorize transaction 726 state is depicted by complete 730, and the transition between the check bank account 720 state and the authorize transaction 726 state is depicted by complete 732.

Therefore, in this example, the workflow evaluation thread may return to the workflow evaluation service a workflow decision to do nothing. However, when the workflow handling service is called due to check bank account 720 task or tasks being completed, the workflow evaluation thread may determine that preconditions for executing have been satisfied, and generate a workflow decision corresponding to authorization of the transaction, as depicted at 726.

Similarly, the ship order 728 state may not have any corresponding tasks execute until tasks corresponding, respectively, to authorize transaction 726, notify accounting 722, and record transaction attempt 724 have completed. The transition between the notify accounting 722 state and the ship order 728 state is depicted by complete 734, and the transition between the record transaction attempt 724 state and the ship order 728 state is depicted by complete 736.

In this way, a workflow service may process the workflow corresponding to state machine 700, and correspondingly, fulfill an order.

Figure 8:
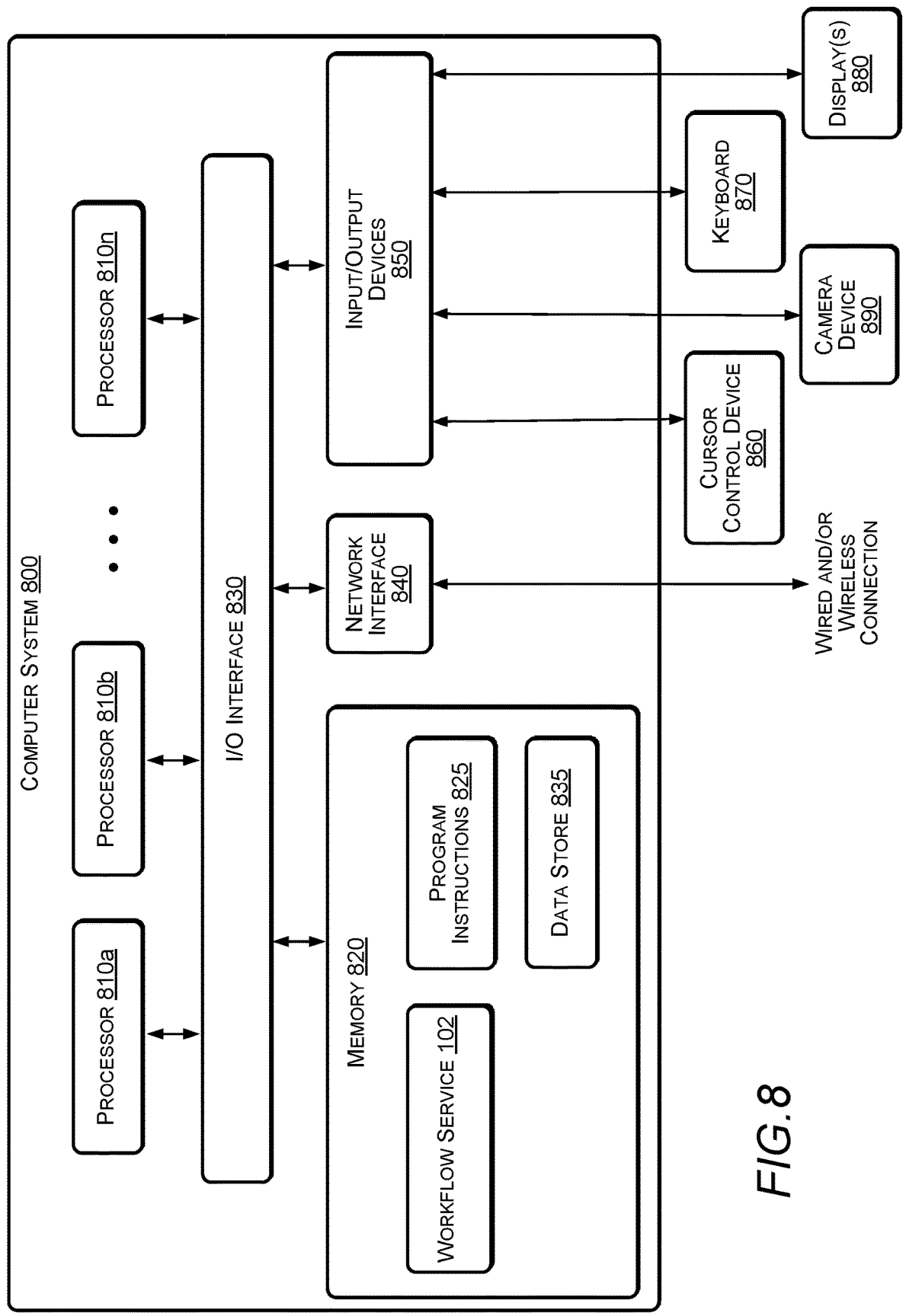
FIG. 8 illustrates a computer system including an implementation of a workflow service according to some implementations.

FIG. 8 illustrates an example computer system, computer system 800, where computer system 800 may be configured to implement different workflow service implementations, according to the discussed embodiments and examples. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device. Generally, the methods described herein may in various embodiments be implemented by any combination of hardware and software.

Further, the methods described herein may in various embodiments be implemented by any combination of hardware and software. For example, the methods may be implemented by computer system 800 that includes one or more processors executing program instructions stored on a computer-readable storage medium coupled to the processors. The program instructions may be configured to implement the functionality described herein (e.g., the functionality of various servers and other components that implement the look-up component described herein). The various methods as illustrated in the figures and described herein represent example embodiments of methods. The order of any method may be changed, and various elements may be added, reordered, combined, omitted, or modified.

Computer system 800 includes one or more processors 810*a*-810*n* (any of which may include multiple cores, which may be single or multi-threaded) coupled to a system memory 820 via an input/output (I/O) interface 830. Computer system 600 further includes a network interface 840 coupled to I/O interface 830. In various embodiments, computer system 800 may be a uniprocessor system including one processor, or a multiprocessor system including several processors (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA. The computer system 800 also includes one or more network communication devices (e.g., network interface 840) for communicating with other systems and/or components over a communications network (e.g. Internet, LAN, etc.). For example, a client application executing on system 800 may use network interface 840 to communicate with a server application executing on a single server or on a cluster of servers that implement one or more of the components of the systems described herein. In another example, an instance of a server application executing on computer system 800 may use network interface 840 to communicate with other instances of the server application (or another server application) that may be implemented on other computer systems. Further, computer system 800, via I/O interface 830, may be coupled to one or more input/output devices 850, such as cursor control device 860, keyboard 870, camera device 890, and one or more displays 880.

In the illustrated embodiment, computer system 800 also includes one or more persistent storage devices and/or one or more I/O devices 850. In various embodiments, persistent storage devices may correspond to disk drives, tape drives, solid state memory, other mass storage devices, or any other persistent storage device. Computer system 800 (or a distributed application or operating system operating thereon) may store instructions and/or data in persistent storage devices, as desired, and may retrieve the stored instruction and/or data as needed. For example, in some embodiments, computer system 800 may host a storage system server node, and persistent storage may include the SSDs attached to that server node.

Computer system 800 includes one or more system memories 820 that are configured to store instructions and data accessible by processor(s) 810. In various embodiments, system memories 820 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 820 may contain program instructions 825 that are executable by processor(s) 810 to implement the methods and techniques described herein. In various embodiments, program instructions 825 may be encoded in platform native binary, any interpreted language such as Java™ bytecode, or in any other language such as C/C++, Java™, etc., or in any combination thereof. For example, in the illustrated embodiment, program instructions 825 include program instructions executable to implement the functionality of a database service, tracking-enabled client, update tracker, update listener, and/or update consumer in different embodiments. In some embodiments, program instructions 825 may implement multiple separate clients, server nodes, and/or other components.

In some embodiments, program instructions 825 may include instructions executable to implement an operating system (not shown), which may be any of various operating systems, such as UNIX, LINUX, Solaris™, MacOS™, Windows™, etc. Any or all of program instructions 825 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 600 as system memory 820 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 840.

In some embodiments, system memory 820 may include data store 835, which may be configured as described herein. In general, system memory 820 (e.g., data store 835 within system memory 820), persistent storage, and/or remote storage may store data blocks, replicas of data blocks, metadata associated with data blocks and/or their state, configuration information, and/or any other information usable in implementing the methods and techniques described herein. Further, data store 820 may include modules for implementing an active content filter 110 in an embodiment of a static content endpoint server.

In one embodiment, I/O interface 830 may be configured to coordinate I/O traffic between processor(s) 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor(s) 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor(s) 810.

Network interface 840 may be configured to allow data to be exchanged between computer system 800 and other devices attached to a network, such as other computer systems (which may implement one or more storage system server nodes, database engine head nodes, and/or clients of the database systems described herein), for example. In addition, network interface 840 may be configured to allow communication between computer system 800 and various I/O devices 850 and/or remote storage. Input/output devices 850 may, in some embodiments, include one or more display terminals, keyboards, keypads, touchpads, scanning devices, voice or optical recognition devices, or any other devices suitable for entering or retrieving data by one or more computer systems 800. Multiple input/output devices 850 may be present in computer system 800 or may be distributed on various nodes of a distributed system that includes computer system 800. In some embodiments, similar input/output devices may be separate from computer system 800 and may interact with one or more nodes of a distributed system that includes computer system 800 through a wired or wireless connection, such as over network interface 840. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol. In various embodiments, computer system 800 may include more, fewer, or different components than those illustrated (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more computing devices configured to implement a client interface to a workflow service, a workflow translator service, and the workflow service,
wherein the client interface is configured to:
receive one or more BPMN workflows defined in accordance with a business process model and notation (BPMN) standard workflow domain specific language, wherein the BPMN workflow domain specific language is specific to a first workflow application domain and is structured according to a graph-based data structure that visually defines the one or more workflows using graphical elements; and
receive one or more other workflows defined in a tree-based workflow domain specific language, wherein the tree-based workflow domain specific language is specific to a different workflow application domain and is structured according to a different data structure than the BPMN workflow domain specific language;
wherein the workflow translator service is configured to:
identify graphical elements of an in-memory model of respective ones of the one or more workflows defined in the BPMN domain specific language that correspond to workflow elements in the tree-based workflow domain specific language; and
select the corresponding workflow elements in the tree-based workflow domain specific language for inclusion in one or more respective workflow definitions for the one or more BPMN workflows received in the BPMN workflow domain specific language, wherein the one or more respective workflow definitions define the received one or more BPMN workflows in the tree-based workflow domain specific language; and
wherein the workflow service is configured to:
store, in a workflow data store, the one or more respective workflow definitions for the one or more workflows translated from the BPMN domain specific language to the tree-based workflow domain specific language, wherein the respective ones of the one or more workflow definitions define states of a respective workflow indicating tasks to be performed for the respective workflow and transitions between the states;
store, in the workflow data store, the one or more other workflows defined in the tree-based domain specific language, wherein the one or more other workflows define other states of another respective workflow indicating tasks to be performed for the other respective workflow and transitions between the other states;
receive a request for a workflow decision;
allocate, in response to receiving the request for the workflow decision, computing resources for executing a workflow evaluation thread, wherein the workflow evaluation thread is configured to:
generate a state machine for a particular workflow according to a particular workflow definition translated from the BPMN domain specific language to the tree-based domain specific language or according to a particular workflow definition of the one or more other workflows received in the tree-based domain specific language;
evaluate a current state for the particular workflow to determine a workflow decision for the particular workflow; and
provide the workflow decision;
unallocate the computing resources allocated for the workflow evaluation thread after the workflow decision is determined and provided; and
schedule for execution a task corresponding to the workflow decision.

2. The system of claim 1, wherein the translator service is further configured to:
for at least one of the one or more workflows, convert the workflow defined in the BPMN domain specific language into the in-memory model of the at least one workflow, wherein the in-memory model is a graphical model of the at least one workflow; and
traverse the in-memory graphical model of the at least one workflow to identify the graphical elements of the in-memory graphical model that correspond to the workflow elements in the tree-based workflow domain specific language.

3. The system of claim 1,
wherein other computing resources are allocated to perform the task corresponding to the workflow decision.

4. A method, comprising:
implementing a user interface to a workflow service, the user interface configured to:
receive a BPMN workflow defined in accordance with a business process model and notation (BPMN) standard workflow domain specific language structured according to a graph-based data structure that visually defines the workflow using graphical elements; and
receive another workflow defined in a tree-based workflow domain specific language, wherein the tree-based workflow domain specific language is specific to a different workflow application domain and is structured according to a different data structure than the BPMN workflow domain specific language;

receiving, via the user interface, a workflow defined in the BPMN workflow domain specific language;

identifying graphical elements of an in-memory model of the workflow defined in the BPMN domain specific language that correspond to workflow elements in the tree-based workflow domain specific language;

selecting the corresponding workflow elements in the tree-based workflow domain specific language for inclusion in a workflow definition for the workflow received in the BPMN workflow domain specific language, wherein the workflow definition defines the received BPMN workflow in the tree-based domain specific language;

storing the workflow definition according to the tree-based workflow domain specific language for execution by the workflow service, wherein the workflow definition comprises states of the workflow, tasks to be performed, and transitions between the states;

receiving a request for a workflow decision;

allocating, in response to receiving the request for the workflow decision, computing resources for executing a workflow evaluation thread, wherein the workflow evaluation thread causes the computing resources to:

generate a state machine for a particular workflow according to a particular workflow definition translated from the BPMN domain specific language to the tree-based domain specific language or according to a particular workflow definition of the one or more other workflows received in the tree-based domain specific language;

evaluate a current state for the particular workflow to determine a workflow decision for the particular workflow; and provide the workflow decision;

unallocating the computing resources allocated for the workflow evaluation thread after the workflow decision is determined and provided; and scheduling for execution a task corresponding to the workflow decision.

5. The method of claim 4, wherein said receiving the workflow comprises:

generating a graphical user interface for display to a user; and receiving one or more inputs, via the graphical user interface, to define a visual representation of the BPMN workflow according to the BPMN domain specific language.

6. The method of claim 4, wherein said receiving the workflow comprises:

receiving a workflow file formatted in accordance with the BPMN standard, wherein the method further comprises:

converting the workflow file formatted in accordance with the BPMN standard into the in-memory model of the workflow; and traversing the in-memory model of the workflow to identify graphical elements of the in-memory model that correspond to workflow elements in the tree-based workflow domain specific language.

7. The method of claim 6, further comprising:

identifying one or more elements of the in-memory model for which there is not a corresponding workflow element defined in the tree-based workflow domain specific language; and generating a message indicating the one or more elements are not supported in the tree-based workflow domain specific language.

8. The method of claim 4, wherein the request for the workflow decision specifies a workflow log of events for the workflow, and wherein the workflow evaluation thread is further configured to perform:

prior to said evaluating the current state for the workflow, transitioning the state machine to a current state for the workflow based, at least in part, on the workflow log.

9. The method of claim 4, further comprising:

allocating other computing resources to perform a task of the workflow based on the workflow decision, wherein the other computing resources perform at least a portion of the task after the computing resources allocated for executing the workflow evaluation thread are unallocated.

10. The method of claim 4, further comprising:

prior to said storing the workflow definition according to the tree-based workflow domain specific language, assigning a version identifier to the workflow definition.

11. The method of claim 4, further comprising:

receiving a request to provide the workflow definition stored according to the tree-based workflow domain specific language;

translating the workflow definition stored according to the tree-based workflow domain specific language into the particular translated workflow definition according to the BPMN domain specific language; and providing the particular translated workflow definition according to the BPMN domain specific language.

12. A non-transitory, computer-readable storage medium storing program instructions that when executed by one or more hardware processors:

implement a user interface to a workflow service, wherein the user interface is configured to:

receive a BPMN workflow defined in accordance with a business process model and notation (BPMN) standard workflow domain specific language; and receive other workflow defined in a tree-based workflow domain specific language;

identify elements of an in-memory model of the workflow defined in the BPMN domain specific language that correspond to workflow elements in the tree-based workflow domain specific language;

select the corresponding workflow elements for inclusion in a translated workflow definition for the BPMN workflow according to the tree-based workflow domain specific language; and store the translated workflow definition of the BPMN workflow according to the tree-based workflow domain specific language, wherein the workflow definition comprises states of the workflow, tasks to be performed, and transitions between the states;

receive a request for a workflow decision;

in response to receiving the request for the workflow decision, cause computing resources for executing a workflow evaluation thread to be allocated, wherein the workflow evaluation thread is configured to:

generate a state machine for a particular workflow according to a particular workflow definition translated from the BPMN domain specific language to the tree-based domain specific language or according to a particular workflow definition of the one or more other workflows received in the tree-based domain specific language;

evaluate a current state for the particular workflow to determine a workflow decision for the particular workflow; and provide the workflow decision;

wherein the computing resources allocated for the workflow evaluation thread are unallocated after the workflow decision is determined and provided; and wherein a task corresponding to the workflow decision is scheduled for execution.

13. The non-transitory, computer-readable storage medium of claim 12, wherein the program instructions when executed by the one or more hardware processors further:

generate a graphical user interface for display to a user, wherein said receive the BPMN workflow defined in the BPMN workflow domain specific language comprises:

receive one or more inputs, via the graphical user interface, to define a visual representation of the BPMN workflow according to the BPMN domain specific language.

14. The non-transitory, computer-readable storage medium of claim 12, wherein the received workflow comprises a file formatted in accordance with an extensible mark-up language (XML) standard and formatted in accordance with the BPMN workflow domain specific language standard.

15. The non-transitory, computer readable storage medium of claim 12, wherein the stored workflow definition in accordance with the tree-based workflow domain specific language comprises a file formatted in accordance with a domain specific language standard used by a workflow service that executes the workflow.

16. The non-transitory, computer readable storage medium of claim 12, wherein the program instructions when executed by the one or more hardware processors further:

receive another workflow defined in a third workflow domain specific language;

identify elements of the in-memory model of the workflow defined in the third domain specific language that correspond to workflow elements in the tree-based workflow domain specific language, wherein the tree-based workflow domain specific language is structured using a different structure than the third workflow domain specific language;

select the corresponding workflow elements for inclusion in a workflow definition according to the tree-based workflow domain specific language that correspond to the another received workflow defined in the third domain specific language; and store the workflow definition of the other workflow according to the tree-based workflow domain specific language.

* * * * *